US011882070B2

(12) United States Patent
Nagaraja et al.

(10) Patent No.: US 11,882,070 B2
(45) Date of Patent: *Jan. 23, 2024

(54) SEQUENCE FOR REFERENCE SIGNALS DURING BEAM REFINEMENT

(71) Applicant: QUALCOMM Incorporated, San Diego, CA (US)

(72) Inventors: Sumeeth Nagaraja, Los Altos, CA (US); Tao Luo, San Diego, CA (US); Sony Akkarakaran, Poway, CA (US); Makesh Pravin John Wilson, San Diego, CA (US); Xiao Feng Wang, San Diego, CA (US); Juan Montojo, San Diego, CA (US); Shengbo Chen, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/091,684

(22) Filed: Nov. 6, 2020

(65) Prior Publication Data

US 2021/0135804 A1 May 6, 2021

Related U.S. Application Data

(63) Continuation of application No. 15/963,785, filed on Apr. 26, 2018, now Pat. No. 10,841,062.
(Continued)

(51) Int. Cl.
*H04L 5/00* (2006.01)
*H04W 74/08* (2009.01)
(Continued)

(52) U.S. Cl.
CPC ............ *H04L 5/005* (2013.01); *H04B 7/0695* (2013.01); *H04B 7/088* (2013.01); *H04L 5/0048* (2013.01);
(Continued)

(58) Field of Classification Search
None
See application file for complete search history.

(56) References Cited

U.S. PATENT DOCUMENTS 9,559,820 B2  1/2017 Geirhofer et al.
2009/0041240 A1* 2/2009 Parkvall ............ H04W 72/0413
                                              380/247
(Continued)

FOREIGN PATENT DOCUMENTS

CN    102804895 A    11/2012
CN    105453629 A    3/2016
(Continued)

OTHER PUBLICATIONS

Taiwan Search Report—TW107114435—TIPO—dated Mar. 28, 2021.
(Continued)

*Primary Examiner* — Christine T Duong
(74) *Attorney, Agent, or Firm* — Holland & Hart LLP/QUALCOMM Incorporated

(57) ABSTRACT

Methods, systems, and devices for wireless communication are described. Wireless communications systems may support beamformed transmissions between devices (e.g., to improve coverage range). The beamformed transmissions may depend on discovery and maintenance of receive and transmit beams over which a given device may communicate with another device. Various receive and transmit beams for a given device may be compared using reference signals. As the number of devices attempting to access a cell
(Continued)

increases, the number of reference signals to be transmitted may scale proportionally. Large numbers of reference signals may flood time-frequency resources of the system and/or require excessive processing at a mobile device. Scrambling sequences for reference signals may be employed to improve efficiency of resource usage. In aspects, the scrambling sequences may be implicitly determined (e.g., based on resources over which the access request was transmitted). Such an implicit association may reduce the need for additional signaling.

93 Claims, 16 Drawing Sheets

Related U.S. Application Data

(60) Provisional application No. 62/501,619, filed on May 4, 2017.

(51) Int. Cl.
| | | |
|---|---|---|
| *H04B 7/06* | | (2006.01) |
| *H04B 7/08* | | (2006.01) |
| *H04W 16/28* | | (2009.01) |
| *H04B 7/0404* | | (2017.01) |
| *H04W 72/23* | | (2023.01) |

(52) U.S. Cl.
CPC ....... *H04W 16/28* (2013.01); *H04W 74/0833* (2013.01); *H04B 7/0404* (2013.01); *H04W 72/23* (2023.01)

(56) References Cited

U.S. PATENT DOCUMENTS

| | | |
|---|---|---|
| 2012/0052828 A1 | 3/2012 | Kamel et al. |
| 2012/0113938 A1 | 5/2012 | Larsson et al. |
| 2013/0034064 A1 | 2/2013 | Nam et al. |
| 2013/0201942 A1 | 8/2013 | Kim et al. |
| 2013/0294366 A1 | 11/2013 | Papasakellariou et al. |
| 2014/0293943 A1 | 10/2014 | Yoon |
| 2015/0139001 A1 | 5/2015 | Xue et al. |
| 2015/0189638 A1 | 7/2015 | Lin et al. |
| 2015/0230266 A1 | 8/2015 | Sung et al. |
| 2015/0373626 A1 | 12/2015 | Yi et al. |
| 2016/0029358 A1 | 1/2016 | Hou et al. |
| 2016/0174244 A1 | 6/2016 | Kim et al. |
| 2016/0352396 A1 | 12/2016 | Seol et al. |
| 2017/0013643 A1 | 1/2017 | Nan et al. |
| 2018/0048375 A1 | 2/2018 | Guo et al. |
| 2018/0295614 A1 | 10/2018 | Parkvall et al. |
| 2018/0331794 A1 | 11/2018 | Nagaraja et al. |
| 2019/0037609 A1* | 1/2019 | Harada ................ H04B 7/0695 |
| 2019/0098672 A1 | 3/2019 | Murray et al. |

FOREIGN PATENT DOCUMENTS

| | | |
|---|---|---|
| CN | 105940615 A | 9/2016 |
| WO | WO-2012112281 | 8/2012 |
| WO | WO2016086144 A1 | 6/2016 |
| WO | WO-2016148795 A1 | 9/2016 |

OTHER PUBLICATIONS

International Preliminary Report on Patentability—PCT/US2018/029998, The International Bureau of WIPO—Geneva, Switzerland, dated Nov. 14, 2019.

International Search Report and Wri I I bN OPINION - PCT/US2018/029998 - ISA/EPO -2018-07-30.

CATT: "Further Details on NR 4-Step RA Procedure", 3GPP TSG RAN WG1 Meeting #88, R1-1702066, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 7, 2017, XP051209227, 6 Pages.

ERICSSON: "NR Random-Access Response Design", 3GPP TSG-RAN WG1 Meeting #88bis, R1-1706019, No. Spokane, WA, USA, Apr. 3, 2017-Apr. 7, 2017, 4 Pages, Mar. 25, 2017.

Samsung: "Discussion on UL DMRS Design for NR", 3GPP TSG RAN WG1 Meeting #88bis, R1-1705354, Spokane, USA, Apr. 3-7, 2017, 3 Pages.

* cited by examiner

US 11,882,070 B2

SEQUENCE FOR REFERENCE SIGNALS DURING BEAM REFINEMENT

CROSS REFERENCES

The present application for patent is a continuation of U.S. patent application Ser. No. 15/963,785 by Nagaraja et al., entitled "Sequence For Reference Signals During Beam Refinement" filed Apr. 26, 2018, which claims priority to U.S. Provisional Patent Application No. 62/501,619 by Nagaraja et al., entitled "Sequence For Reference Signals During Beam Refinement," filed May 4, 2017, which is assigned to the assignee hereof and expressly incorporated by reference herein in its entirety.

BACKGROUND

The following relates generally to wireless communication and, more specifically, to sequences for reference signals during beam refinement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems (e.g., systems supporting millimeter wave (mmW) communications), beamforming may be used in order to overcome the relatively high path losses associated with frequencies in these systems. In order to support beamformed transmissions, communicating wireless devices (e.g., a base station, UE, etc.) may be operable to discover and maintain suitable beams for a given communication link. The set of procedures and protocols required for this task may be referred to as beam refinement. As an example, beam refinement may be based on a UE observing beamformed downlink reference signals from a base station and reporting one or more performance metrics for the respective beamformed reference signals back to the base station. In some cases, multiple UEs may attempt to access a cell associated with a given base station at the same time (or nearly the same time). The base station may accordingly transmit reference signals to enable beam refinement for multiple UEs. The number of reference signals may scale proportionally to the number of UEs, resulting in measurement overhead for the UEs or signaling overhead for the wireless communications system as a whole. Improved techniques for reference signal management during beam refinement may be desired.

SUMMARY

The described techniques relate to improved methods, systems, devices, or apparatuses that support scrambling sequences for reference signals during beam refinement. In some aspects, one or more user equipments (UEs) may attempt to access a cell of a base station (e.g., using a random access procedure) within a given time period. Each UE may transmit an access request over a set of resources (e.g., time-frequency resources, preamble resources, etc.) corresponding to a detected synchronization signal of the cell. Upon detecting access requests from the one or more UEs, the base station may transmit downlink beam reference signals that are scrambled in a predictable manner. The scrambled downlink beam reference signals may accompany a random access response, which is transmitted within a random access response window corresponding to the access requests from the UEs. Alternatively, the scrambled downlink beam reference signals may precede or come after the random access response within the random access response window. In some cases, the scrambling sequences for the downlink beam reference signals may be based on the resources over which the access request was transmitted. Accordingly, in the case that reference signals for multiple UEs are transmitted over the same resources or over resources which are tied to a common control region, a given UE may infer which reference signals are intended for it by mapping the resources over which the access request was transmitted to one or more potential scrambling sequences. Similarly, on the uplink (and in response to the random access response), the UE may transmit one or more scrambled reference signals (e.g., which may be scrambled using the same scrambling sequences as the downlink reference signals or using scrambling sequences from a different set of potential sequences) to the base station. These uplink reference signals may be accompanied by a report in which the UE conveys one or more preferred downlink transmit beams. Based on the uplink and downlink reference signals, the UE and base station may select uplink and downlink beam pairs for subsequent communications.

A method of wireless communication is described. The method may include receiving a first random access message from a first UE over a first set of resources; transmitting, in a first transmission time interval in response to the first random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources; and receiving first channel feedback information from the first UE, where the first channel feedback information is based on measurements of the downlink beam reference signals.

An apparatus for wireless communication is described. The apparatus may include means for receiving a first random access message from a first UE over a first set of resources; means for transmitting, in a first transmission time interval in response to the first random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources; and means for receiving first channel feedback information from the first UE, where the first channel feedback information is based on measurements of the downlink beam reference signals.

Another apparatus for wireless communication is described. The apparatus may include a processor, memory in electronic communication with the processor, and instructions stored in the memory. The instructions may be operable to cause the processor to receive a first random access message from a first UE over a first set of resources;

transmit, in a first transmission time interval in response to the first random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources; and receive first channel feedback information from the first UE, where the first channel feedback information is based on measurements of the downlink beam reference signals.

A non-transitory computer readable medium for wireless communication is described. The non-transitory computer-readable medium may include instructions operable to cause a processor to receive a first random access message from a first UE over a first set of resources; transmit, in a first transmission time interval in response to the first random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources; and receive first channel feedback information from the first UE, where the first channel feedback information is based on measurements of the downlink beam reference signals.

Some examples of the method, apparatus, and non-transitory computer-readable medium described above may further include processes, features, means, or instructions for sending one or more transmissions to the first UE via a downlink transmit beam selected based on the first channel feedback information.

Some examples of the method, apparatus, and non-transitory computer-readable medium described above may further include processes, features, means, or instructions for identifying, from a plurality of sets of uplink scrambling sequences, a set of uplink scrambling sequences for one or more uplink beam reference signals. Some examples of the method, apparatus, and non-transitory computer-readable medium described above may further include processes, features, means, or instructions for receiving the one or more uplink beam reference signals scrambled with respective ones of the set of uplink scrambling sequences.

In some examples of the method, apparatus, and non-transitory computer-readable medium described above, the set of uplink scrambling sequences may be identified based on the first set of resources, an indicator transmitted in a random access response to the first random access message, a second indicator transmitted in a handover command, or some combination thereof.

Some examples of the method, apparatus, and non-transitory computer-readable medium described above may further include processes, features, means, or instructions for receiving a second random access message from a second UE over a second set of resources. Some examples of the method, apparatus, and non-transitory computer-readable medium described above may further include processes, features, means, or instructions for transmitting, in the first transmission time interval in response to the second random access message, one or more second downlink beam reference signals scrambled with respective downlink scrambling sequences of a second set of downlink scrambling sequences, the second set of downlink scrambling sequences selected from the plurality of sets of downlink scrambling sequences based on the second set of resources. Some examples of the method, apparatus, and non-transitory computer-readable medium described above may further include processes, features, means, or instructions for receiving second channel feedback information from the second UE, where the second channel feedback information may be based on measurements of the second downlink beam reference signals.

Some examples of the method, apparatus, and non-transitory computer-readable medium described above may further include processes, features, means, or instructions for transmitting, in a second transmission time interval, a random access response to the first and second UEs, the random access response including respective grants of uplink resources for the first and second channel feedback information.

In some examples of the method, apparatus, and non-transitory computer-readable medium described above, the random access response may be transmitted within a first response window after the reception of the first random access message and within a second response window after the reception of the second random access message.

Some examples of the method, apparatus, and non-transitory computer-readable medium described above may further include processes, features, means, or instructions for indicating, in a downlink control information transmission, a first transmission time interval for the transmitting of the one or more downlink beam reference signals and the one or more second downlink beam reference signals.

In some examples of the method, apparatus, and non-transitory computer-readable medium described above, the first transmission time interval may be prior to the second transmission time interval or subsequent to the second transmission time interval.

In some examples of the method, apparatus, and non-transitory computer-readable medium described above, the first transmission time interval and the second transmission time interval may be a same transmission time interval.

In some examples of the method, apparatus, and non-transitory computer-readable medium described above, the random access response includes an indicator of a third transmission time interval for transmission of uplink beam reference signals from the first UE. In some examples of the method, apparatus, and non-transitory computer-readable medium described above, a second indicator of a fourth transmission time interval for transmission of second uplink beam reference signals from the second UE.

In some examples of the method, apparatus, and non-transitory computer-readable medium described above, the first set of resources includes time resources, frequency resources, preamble resources, or a combination thereof.

Some examples of the method, apparatus, and non-transitory computer-readable medium described above may further include processes, features, means, or instructions for identifying time and frequency resources for the one or more downlink beam reference signals based on the first set of resources.

Some examples of the method, apparatus, and non-transitory computer-readable medium described above may further include processes, features, means, or instructions for receiving a second random access message from a second UE over the first set of resources. Some examples of the method, apparatus, and non-transitory computer-readable medium described above may further include processes, features, means, or instructions for receiving second channel feedback information from the second UE, where the second channel feedback information may be based on measurements of the downlink beam reference signals.

Some examples of the method, apparatus, and non-transitory computer-readable medium described above may further include processes, features, means, or instructions for receiving a data message from the first UE based on the first random access message, where the set of downlink scrambling sequences are determined based on information within the data message.

A method of wireless communication is described. The method may include identifying a downlink transmit beam of a plurality of downlink transmit beams for synchronization signals transmitted by a base station; transmitting a random access message using a first set of resources, the first set of resources being selected based on the identified downlink transmit beam; receiving, in response to the random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources; and transmitting channel feedback information based on measurements of the downlink beam reference signals.

An apparatus for wireless communication is described. The apparatus may include means for identifying a downlink transmit beam of a plurality of downlink transmit beams for synchronization signals transmitted by a base station; means for transmitting a random access message using a first set of resources, the first set of resources being selected based on the identified downlink transmit beam; means for receiving, in response to the random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources; and means for transmitting channel feedback information based on measurements of the downlink beam reference signals.

Another apparatus for wireless communication is described. The apparatus may include a processor, memory in electronic communication with the processor, and instructions stored in the memory. The instructions may be operable to cause the processor to identify a downlink transmit beam of a plurality of downlink transmit beams for synchronization signals transmitted by a base station; transmit a random access message using a first set of resources, the first set of resources being selected based on the identified downlink transmit beam; receive, in response to the random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources; and transmit channel feedback information based on measurements of the downlink beam reference signals.

A non-transitory computer readable medium for wireless communication is described. The non-transitory computer-readable medium may include instructions operable to cause a processor to identify a downlink transmit beam of a plurality of downlink transmit beams for synchronization signals transmitted by a base station; transmit a random access message using a first set of resources, the first set of resources being selected based on the identified downlink transmit beam; receive, in response to the random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources; and transmit channel feedback information based on measurements of the downlink beam reference signals.

Some examples of the method, apparatus, and non-transitory computer-readable medium described above may further include processes, features, means, or instructions for receiving one or more transmissions from the base station via a downlink beam pair including a downlink transmit beam and a downlink receive beam, the downlink beam pair selected based on the channel feedback information.

Some examples of the method, apparatus, and non-transitory computer-readable medium described above may further include processes, features, means, or instructions for identifying a set of uplink scrambling sequences for one or more uplink beam reference signals from a plurality of sets of uplink scrambling sequences. Some examples of the method, apparatus, and non-transitory computer-readable medium described above may further include processes, features, means, or instructions for transmitting the one or more uplink beam reference signals scrambled with respective ones of the set of uplink scrambling sequences.

In some examples of the method, apparatus, and non-transitory computer-readable medium described above, the set of uplink scrambling sequences may be identified based on the first set of resources, an indicator transmitted in a random access response to the first random access message, a second indicator transmitted in a handover command, or some combination thereof.

Some examples of the method, apparatus, and non-transitory computer-readable medium described above may further include processes, features, means, or instructions for receiving, in a first transmission time interval, a random access response to the random access message, the random access response including a grant of uplink resources for the channel feedback information.

In some examples of the method, apparatus, and non-transitory computer-readable medium described above, the random access response may be received within a response window after the transmission of the random access message.

Some examples of the method, apparatus, and non-transitory computer-readable medium described above may further include processes, features, means, or instructions for identifying a second transmission time interval for the receiving of the one or more downlink beam reference signals based on a downlink control information transmission.

In some examples of the method, apparatus, and non-transitory computer-readable medium described above, the second transmission time interval may be prior to the first transmission time interval or subsequent to the first transmission time interval.

In some examples of the method, apparatus, and non-transitory computer-readable medium described above, the second transmission time interval and the first transmission time interval may be a same transmission time interval.

In some examples of the method, apparatus, and non-transitory computer-readable medium described above, the random access response includes an indicator of a second transmission time interval for transmission of uplink beam reference signals.

In some examples of the method, apparatus, and non-transitory computer-readable medium described above, the first set of resources includes time resources, frequency resources, preamble resources, or a combination thereof.

Some examples of the method, apparatus, and non-transitory computer-readable medium described above may further include processes, features, means, or instructions for identifying time and frequency resources for the one or more downlink beam reference signals based on the first set of resources.

Some examples of the method, apparatus, and non-transitory computer-readable medium described above may further include processes, features, means, or instructions for identifying a downlink transmit beam of a plurality of downlink transmit beams for synchronization signals transmitted by a base station. Some examples of the method, apparatus, and non-transitory computer-readable medium described above may further include processes, features, means, or instructions for selecting the first set of resources based on the identified downlink transmit beam.

DETAILED DESCRIPTION

Figure 1:
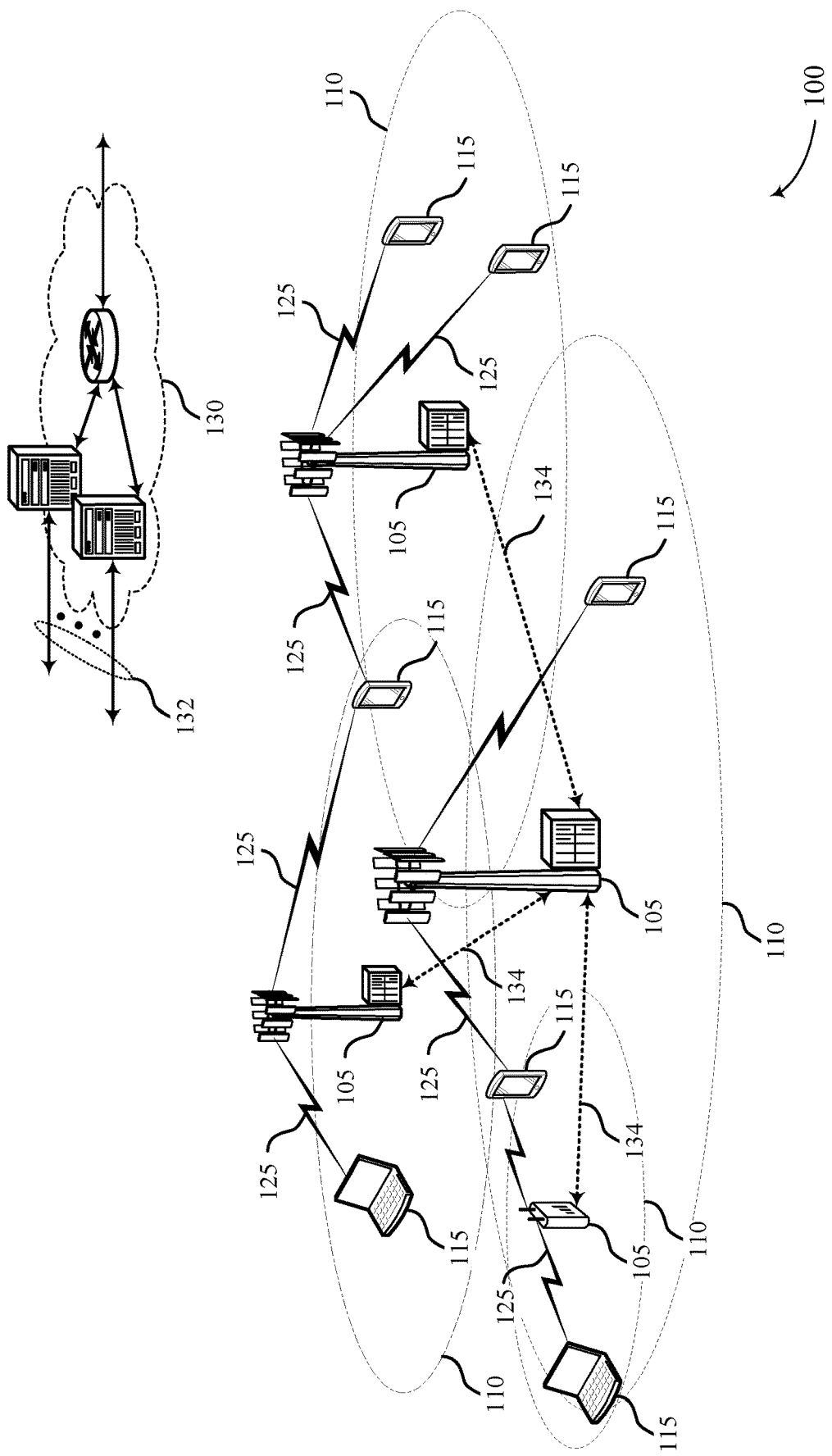
FIG. 1 illustrates an example of a system for wireless communication that supports scrambling sequences for reference signals during beam refinement in accordance with aspects of the present disclosure.

In some wireless communications systems, beamforming is used to overcome path loss associated with operational frequencies of these wireless systems. However, beamforming may generally be used in any scenario in which improved cellular coverage is desired. In order to support beamformed transmissions, communicating devices may perform beam discovery and refinement in which multiple transmit or receive beam candidates are evaluated. In order to evaluate the multiple transmit or receive beams, reference signals may be employed. For example, a base station may transmit multiple reference signals, where each reference signal corresponds to a respective downlink transmit beam. A user equipment (UE) may attempt to receive each reference signal over one or more downlink receive beams. A suitable beam pair (e.g., comprising a downlink transmit beam and a downlink receive beam) may be selected based on one or more reference signal measurements performed at the UE. Subsequent communications may benefit from the use of the selected beam pair. Analogous beam refinement may be performed for uplink transmissions as well.

However, when multiple UEs attempt to access a cell of a base station within a relatively short time frame, the number of reference signals transmitted by the base station may scale proportionally to the number of UEs. The larger number of reference signals may be problematic for the communications system (e.g., because of the large number of resources required to transmit the reference signals as well as the potential for collisions between reference signals intended for different UEs). Additionally, such a large number of reference signals may place an unnecessary computational burden on the UEs, which may attempt to decode and evaluate each received reference signal to determine an optimal beam pair. Accordingly, considerations for management of beam refinement are discussed herein. Such considerations include the use of scrambling sequences applied to the reference signals. In some aspects, the scrambling sequences may be determined based on the set of resources over which a given UE sends its access request. The correspondence between the resources and scrambling sequences may allow a receiver (e.g., the UE, base station, etc.) to identify relevant reference signals to be considered in determining uplink and/or downlink beam pairs. Additionally, the scrambling sequences may effectively spread the reference signals in a code domain, such that multiple reference signals may be transmitted over the same set of time-frequency resources and be separated via spatial and code domain processing by a receiver.

Aspects of the disclosure are initially described in the context of a wireless communications system. Aspects of the disclosure are then described in terms of beam refinement illustrations, resource grids, and process flows. Aspects of the disclosure are further illustrated by and described with reference to apparatus diagrams, system diagrams, and flowcharts that relate to scrambling sequences for reference signals during beam refinement.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, LTE-Advanced (LTE-A) network, or a 5G new radio (NR) network. In some cases, wireless communications system 100 may support enhanced broadband communications, ultra-reliable (i.e., mission critical) communications, low latency communications, and communications with low-cost and low-complexity devices. Wireless communications system 100 may support scrambling sequences for reference signals during beam refinement.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independently of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105, next generation NodeBs (gNBs) 105, etc.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in an eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communications system 100 may operate in an ultra-high frequency (UHF) region using frequency bands from 300 MHz to 3 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. Wireless communications system 100 may also operate in a super high frequency (SHF) region using frequency bands from 3 GHz to 30 GHz, otherwise known as the centimeter band. In some cases, wireless communication system 100 may also utilize extremely high frequency (EHF) portions of the spectrum (e.g., from 30 GHz to 300 GHz), also known as the millimeter band. Systems that use this region may be referred to as millimeter wave (mmW) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Wireless communications system 100 may support millimeter wave (mmW) communications between UEs 115 and base stations 105. Devices operating in mmW, SHF, or EHF bands may have multiple antennas to allow beamforming. Beamforming may also be employed outside of these frequency bands (e.g., in any scenario in which increased cellular coverage is desired). That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the signals. Each of these beams may be referred to as a receive beam in aspects of the present disclosure.

Multiple-input multiple-output (MIMO) wireless systems use a transmission scheme between a transmitter (e.g., a base station 105) and a receiver (e.g., a UE 115), where both transmitter and receiver are equipped with multiple antennas. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Synchronization (e.g., cell acquisition) may be performed using synchronization signals or channels transmitted by a network entity (e.g., a base station 105). A base station may transmit synchronization signal (SS) blocks containing discovery reference signals. SS blocks may include a primary synchronization signal (PSS), a secondary synchronization signal (SSS), or a physical broadcast channel (PBCH). A UE 115 attempting to access a wireless network (e.g., an initial access, beam recovery, handover) may perform a cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization, and may provide a cell group identity value. The cell group identity value may be combined with the physical layer identifier to form the physical cell identifier (PCID), which identifies the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index, etc.). For example, the PBCH may carry master information block (MIB) and one or more system information blocks (SIBs) for a given cell.

Because a base station 105 may not know the locations of devices attempting to synchronize with a cell of the base station, SS blocks may be successively transmitted in a beamswept manner (e.g., in multiple directions across multiple symbol periods). A UE 115 may receive one or more of the SS blocks and determine a suitable downlink beam pair (e.g., based on a signal quality of the SS block being greater than a threshold). However, the beams over which the SS blocks are transmitted may be relatively coarse (e.g., broad) and may have low beamforming gains. Accordingly, communications between the UE 115 and base station 105 may benefit from beam refinement, in which narrower uplink and downlink receive and transmit beams of higher beamforming gains are selected. The width of a given beam (e.g., a narrow beam, a broad beam) may be modified by adjusting weighting of one or more of the elements in a transmitting or receiving antenna array. Such adjustments may be empirically determined by a receiving device (e.g., based on measurements of one or more reference signals). Each UE 115 attempting to access a given cell may receive a set of downlink reference signals and transmit a set of uplink reference signals to enable such beam refinement. However, because of the potential for multiple UEs 115 to access a given cell within a certain time period, the number of reference signals may be relatively large. Attempting to process all of these reference signals may unnecessarily burden the UE 115 (e.g., increasing processing latency and/or power consumption).

In aspects of the present disclosure, uplink and downlink reference signals associated with different beams may be scrambled using different scrambling sequences. According to some aspects, the set of scrambling sequences available for a given reference signal may be determined based on the resources (e.g., time-frequency resources, preamble identifier, etc.) over which the UE 115 transmits an access request. Such an association between scrambling sequences and access resources (e.g., which may be referred to as physical random access channel (PRACH) resources) may provide for separability between reference signals intended for UEs 115 that transmit access requests over separate PRACH resources. For example, a given set of PRACH resources (e.g., time-frequency resources and preamble identifier) may be associated with a given set of scrambling sequences. Another set of PRACH resources (e.g., the same time-frequency resources but a different preamble identifier, a different set of time-frequency resources) may be associated with a second set of scrambling sequences.

Although described in the context of initial cell access, it is to be understood that the described techniques for beam refinement may apply in various circumstances. Considered scenarios in addition to an access procedure include handover, beam recovery (e.g., after a radio link failure), system access based on paging, etc. For example, beam refinement may be performed during handover of a UE 115 to a neighboring cell. As with the initial access techniques described herein, beam refinement for handover (e.g., as well as beam recovery or system access based on paging) may employ scrambling of reference signals. In some cases, the scrambling sequences for the reference signals may be implicitly determined (e.g., based on a set of resources over which some prior transmission, such as a synchronization signal, was received) or they may be explicitly indicated (e.g., based on an indicator included in a previous transmission). For example, during a handover procedure, a UE 115 may receive a handover command which includes an indicator of a set of potential scrambling sequences which may be used for downlink and/or uplink reference signals. Additionally or alternatively, a UE 115 may receive a handover command that includes an indicator of a set of contention-free or limited contention access resources, which may then be used for determining a set of scrambling sequences for downlink and/or uplink reference signals. Accordingly, though various signals below are described in terms of the random access procedure (e.g., access request, access response), it is to be understood that the described concepts may be easily extended to other beam refinement procedures.

Figure 2:
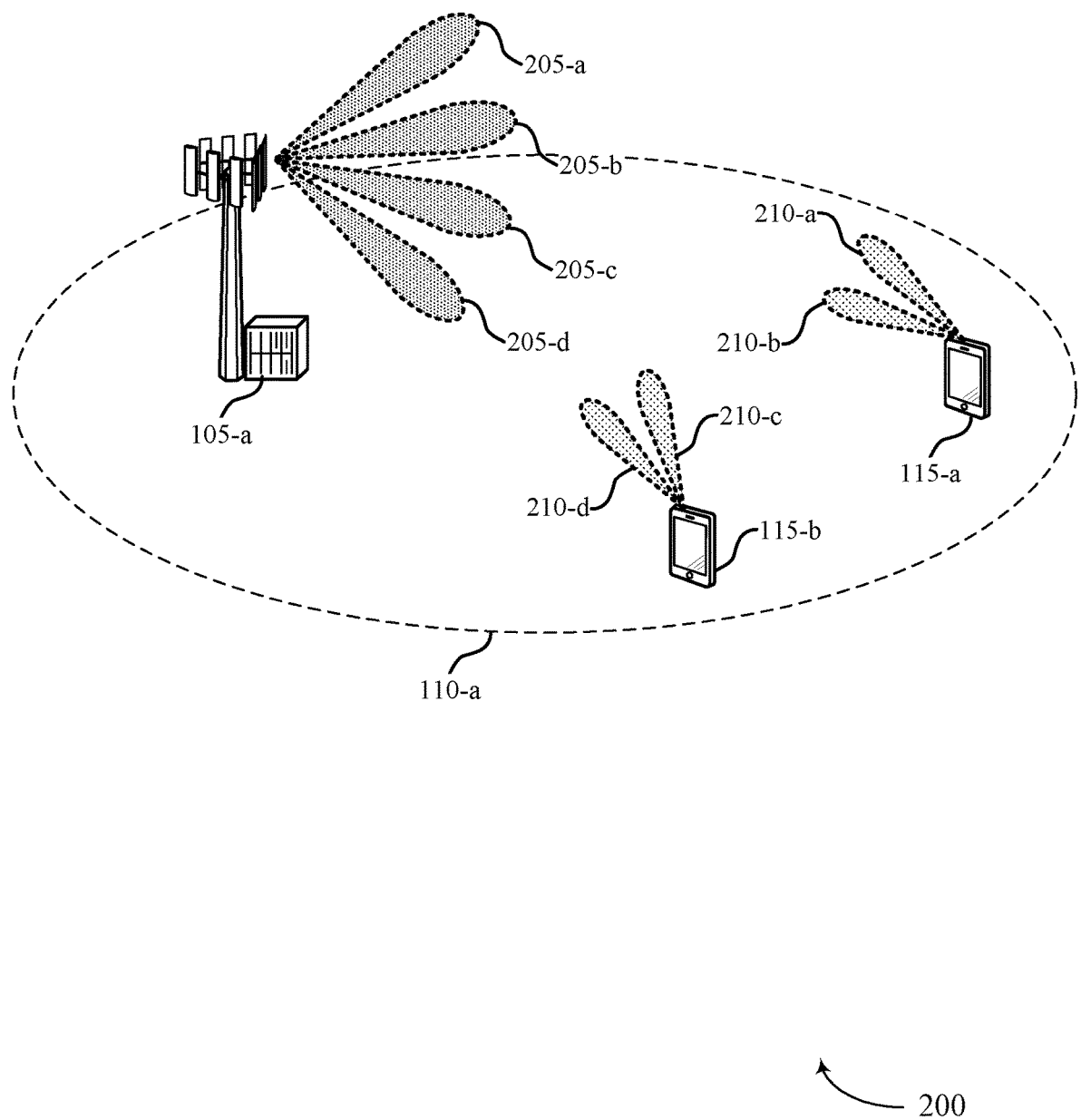
FIG. 2 illustrates an example of a wireless communications system that supports scrambling sequences for reference signals during beam refinement in accordance with aspects of the present disclosure.

FIG. 2 illustrates an example of a wireless communications system 200 that supports scrambling sequences for reference signals during beam refinement in accordance with various aspects of the present disclosure. Wireless communications system 200 includes a base station 105-*a* and UEs 115-*a* and 115-*b*, each of which may be an example of the corresponding device described with reference to FIG. 1.

Wireless communications system 200 may operate in frequency ranges that are associated with beamformed transmissions between base station 105-*a* and UEs 115-*a* and 115-*b*. For example, wireless communications system 200 may operate using mmW frequency ranges. As a result, signal processing techniques such as beamforming may be used to improve communication quality.

By way of example, base station 105-*a* may contain multiple antennas. In some cases, each antenna may transmit a phase-shifted version of a signal such that the phase-shifted versions constructively interfere in certain regions and destructively interfere in others (e.g., in order to steer the beams in a desired direction and/or to control the width of the beam). The region in which strong constructive interference occurs may in some cases be referred to as a beam. Weights may be applied to the various phase-shifted versions. Such techniques (or similar techniques) may serve to increase the coverage area 110-*a* of the base station 105-*a* or otherwise benefit the wireless communications system 200.

Transmit beams 205 represent examples of beams over which information may be transmitted. Accordingly, each transmit beam 205 may be directed from base station 105-*a* toward a different region of the coverage area 110-*a*, and, in some cases, two or more beams may overlap. Multiple transmit beams 205 may be transmitted simultaneously or sequentially. In either case, UE 115-*a* and/or 115-*b* may be capable of receiving one or more transmit beams 205 via a receive beam 210.

In one example, UE 115-*a* may form receive beams 210-*a* and 210-*b*. Similar to base station 105-*a*, UE 115-*a* may contain multiple antennas. In some cases, receive beams 210-*a* and 210-*b* may each receive signals sent over transmit beam 205-*a* and transmit beam 205-*b*. Because the signal transmitted over transmit beam 205-*a* experiences different path losses and phase shifts on its way to the respective antennas of UE 115-*a* and because each receive beam 210-*a* and 210-*b* weights antennas of UE 115-*a* differently, the signal received over receive beam 210-*a* may have different signal properties from the signal received over receive beam 210-*b*. Similar differences in signal quality may be observed for the signal transmitted over transmit beam 205-*b*. UE 115-*a* may select a transmit beam 205 and a receive beam 210 based on the received signal quality. The transmit beam 205 and corresponding receive beam 210 may be referred to as a beam pair. Various methods for identifying a desired beam pair are considered within the scope of the present disclosure. For example, in some cases, base station 105-*a* may repeat transmissions over multiple transmit beams 205 (e.g., in every direction), and UE 115-*a* may report a beam for receiving downlink transmissions (e.g., transmit beam 205-*a*, 205-*b*, 205-*c*, or 205-*d*) with a signal quality above a threshold or may report the strongest received beam. These transmit beams 205 may be broadcast beams directed to multiple UEs 115 and may each be associated with an SS block. Additionally or alternatively, base station 105-*a* may transmit multiple UE-specific transmit beams 205 over a small angular region (e.g., to assist UE 115-*a* in fine-tuning the selected transmit beam 205). Further, in some cases, base station 105-*a* may repeat transmission of a single transmit beam (e.g., transmit beam 205-*a*) multiple times (e.g., to allow UE 115-*a* to compare multiple receive beams 210-*a* and 210-*b*).

Analogous beam pair determinations may be performed at UE 115-*b*. That is, UE 115-*b* may form one or more receive beams 210-*c* and/or 210-*d*. The receive beams 210-*c* and 210-*d* may each receive signals transmitted over one or more transmit beams 205 (e.g., transmit beams 205-*a*, 205-*b*, 205-*c*, or 205-*d*). In aspects of the present disclosure, each transmit beam 205 may carry a respective reference signal. Similarly, each receive beam 210 may be employed to receive one or more reference signals. UEs 115-*a* and 115-*b* may measure reference signals of the various transmit beams 205 received over the various receive beams 210 and determine a beam pair. For example, the beam pair for UE 115-*a* may include transmit beam 205-*b* and receive beam 210-*a*, while the beam pair for UE 115-*b* may include transmit beam 205-*d* and receive beam 210-*d*.

It is to be understood, that while the examples above are described in terms of downlink transmissions (i.e., such that the transmit beams 205 originate at the base station 105-*a*), analogous considerations for uplink transmissions are included in the scope of the present disclosure. For example, UEs 115-*a* and 115-*b* may transmit reference signals over multiple transmit beams 210, which are received at base station 105-*a* over one or more receive beams 205.

Figure 3A:
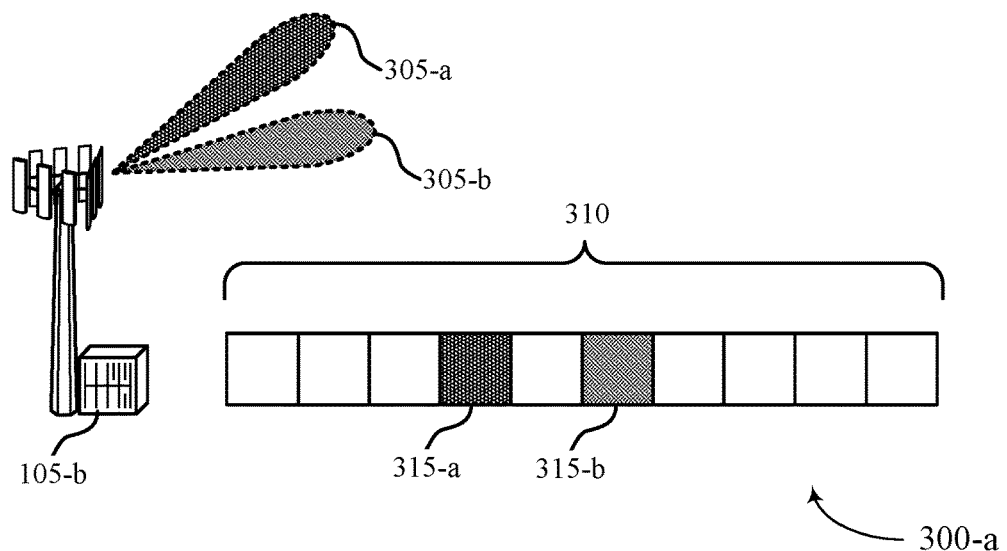
FIG. 3A illustrates an example of a synchronization transmission that supports scrambling sequences for reference signals during beam refinement in accordance with aspects of the present disclosure.

FIG. 3A illustrates an example of a synchronization transmission 300-*a* in accordance with various aspects of the present disclosure. Synchronization transmission 300-*a* may represent aspects of techniques performed within wireless communications systems 100 or 200 as described above. As illustrated, synchronization transmission 300-*a* may originate at base station 105-*b*, which may be an example of the corresponding device described with reference to FIGS. 1 and 2.

Synchronization transmission 300-*a* may include SS blocks transmitted over transmit beams 305-*a* and 305-*b* in a beamswept fashion over a synchronization period 310. For example, synchronization period 310 may include multiple time intervals 315 (e.g., which may be symbol periods, fractions thereof, subframes, or any other suitable time interval). The SS block of transmit beam 305-*a* may be transmitted in time interval 315-*a*, and the SS block of transmit beam 305-*b* may be transmitted in time interval 315-*b*. Alternatively, the SS blocks may be transmitted over the respective transmit beams 305 in the same time interval 315-*b*.

Figure 3B:
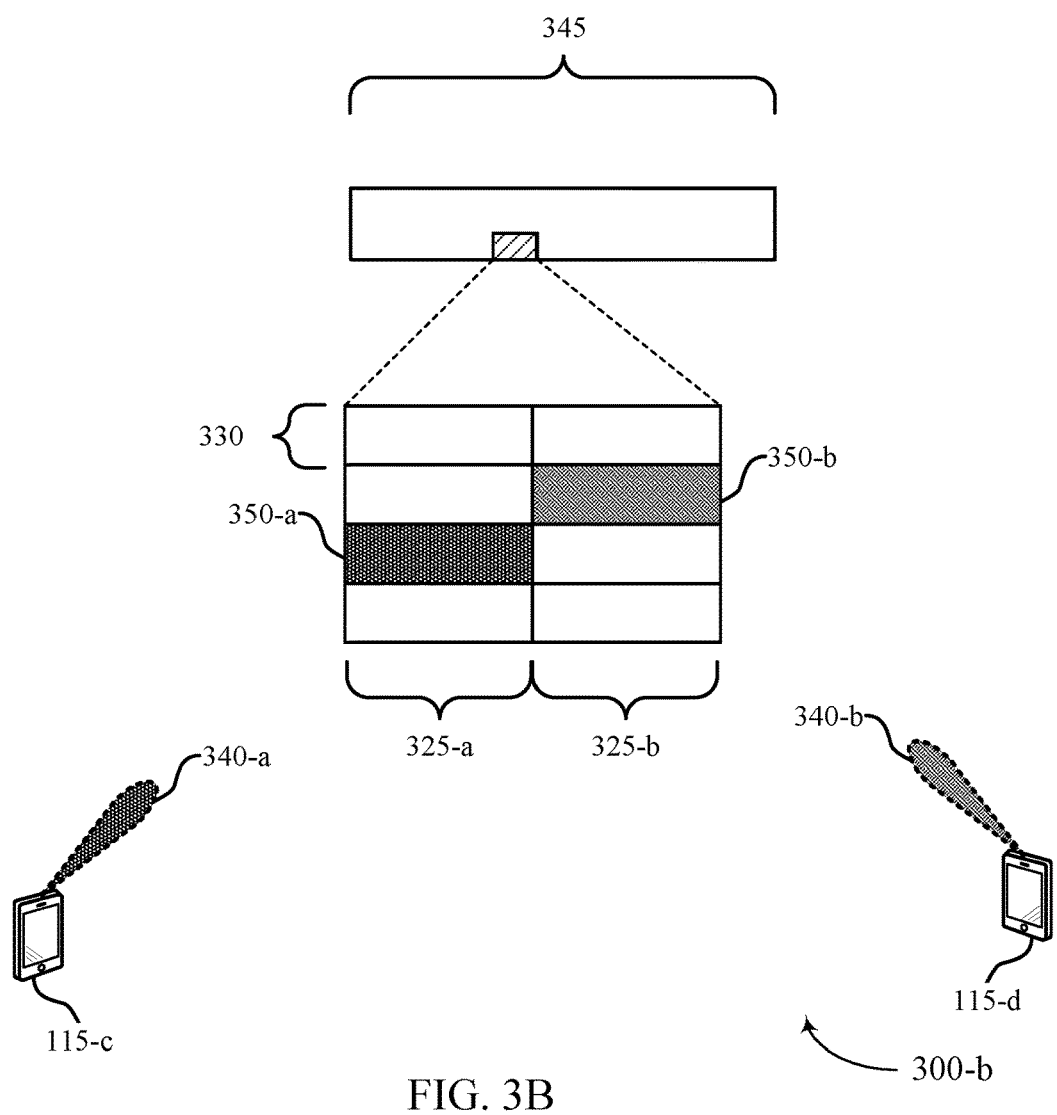
FIG. 3B illustrates an example of an access channel configuration that supports scrambling sequences for reference signals during beam refinement in accordance with aspects of the present disclosure.

FIG. 3B illustrates an example of a PRACH configuration 300-*b*. PRACH configuration 300-*b* includes UEs 115-*c* and 115-*d*, each of which may be an example of the corresponding devices described above with reference to FIGS. 1, 2, and 3A. For example, UEs 115-*c* and 115-*d* may be located in different regions of a coverage area of base station 105-*b* as described with reference to FIG. 3A. Accordingly, UE 115-*c* may receive the SS block transmitted in time-interval 315-*a* with a signal quality exceeding a threshold while UE 115-*d* may receive the SS block transmitted in time interval 315-*b* with a signal quality exceeding the threshold. UEs 115-*c* and 115-*d* may then transmit respective access requests over respective uplink transmit beams 340-*a* and 340-*b* (e.g., which may be derived from receive beams used for receiving the respective downlink transmit beams 305 in FIG. 3A).

For example, UEs 115-*c* and 115-*d* may use resources 350 within an access request period 345 to transmit the access requests. As illustrated, UEs 115-*c* and 115-*d* use respective PRACH resources 350 of access request period 345 to transmit the access requests. For example, access request period 345 may be divided into access request interval 325-*a*, access request interval 325-*b*, and frequency regions 330 for the sake of explanation. In some examples, access request intervals 325 may be a same interval as time intervals 315 of FIG. 3A. In other examples, access request intervals 325 may be longer or shorter than time intervals 315 (e.g., access request intervals 325 may span multiple time intervals 315). Each time interval 315 of FIG. 3A may be mapped to respective PRACH resources 350 (e.g., based on system information or preconfigured parameters). Accordingly, UE 115-*c* may, upon selecting a downlink transmit beam transmitted in an SS block in time period 315-*a*, identify PRACH resources 350-*a* on which to transmit the access request over transmit beam 340-*a*. Similarly, UE 115-*d* may, upon selecting a downlink transmit beam transmitted in the SS block in time period 315-*b*, identify PRACH resources 350-*b* on which to transmit the access request over transmit beam 340-*b*. In some aspects, the PRACH resources 350 may include a preamble identifier of a set of preamble identifiers (e.g., multiple PRACH resources 350 may share the same time-frequency resources but be associated with different preamble identifiers). Base station 105-*b* may expect access requests within access request period 345 and may accordingly perform beam sweeping of receive beams corresponding to the beam sweeping used for transmission of the SS blocks (e.g., such that base station 105-*b* receives access requests from a given segment of the coverage area using respective receive beams).

Figure 4:
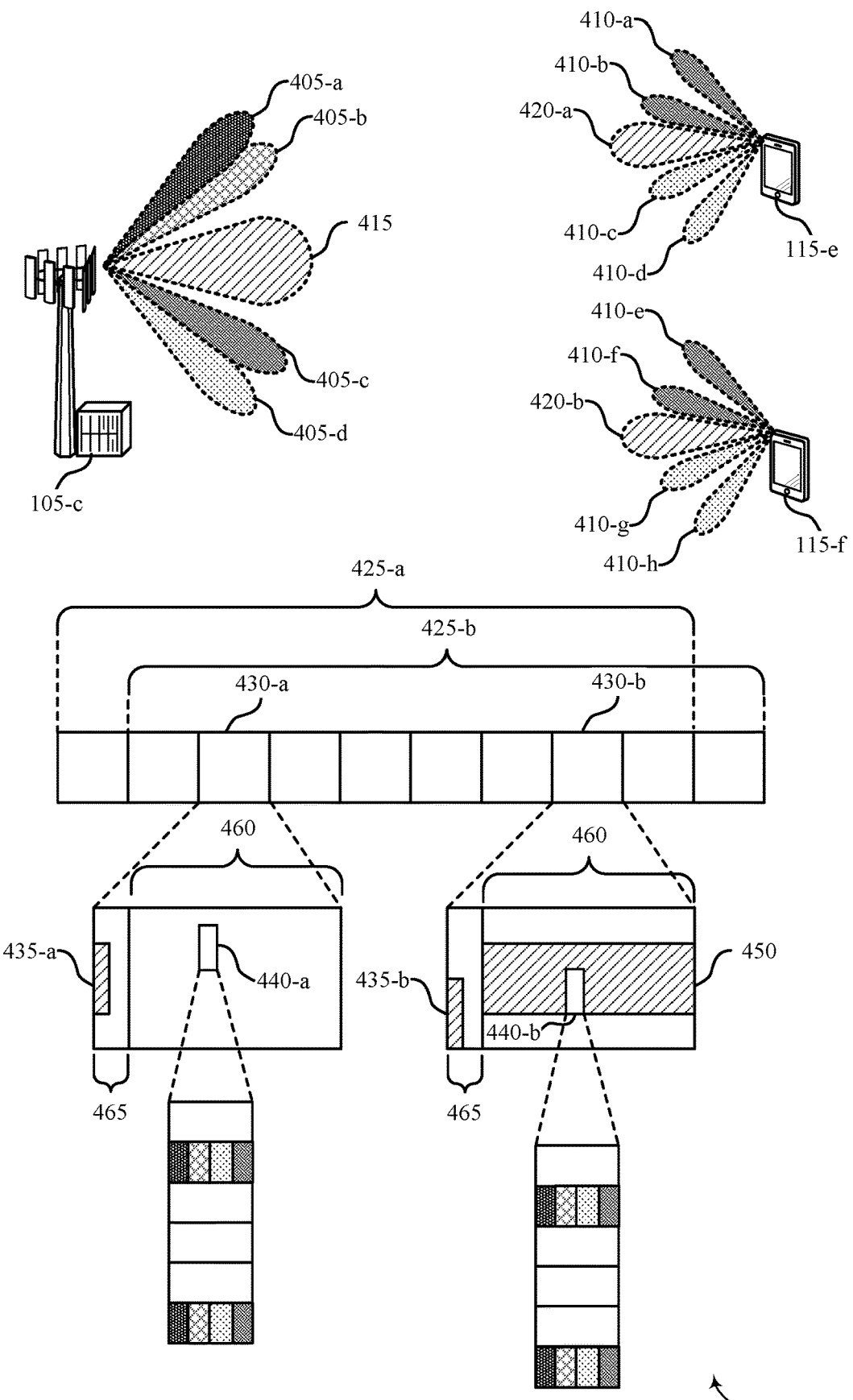
FIG. 4 illustrates an example of a random access response configuration that supports scrambling sequences for reference signals during beam refinement in accordance with aspects of the present disclosure.

FIG. 4 illustrates an example of a random access response configuration 400 that supports scrambling sequences for reference signals during beam refinement in accordance with various aspects of the present disclosure. In some examples, random access response configuration 400 may represent aspects of wireless communications system 100. Random access response configuration 400 includes base station 105-*c* and UEs 115-*e* and 115-*f*, each of which may be an example of the corresponding device described above with reference to FIGS. 1-3B.

As illustrated, base station 105-*c* may transmit a random access response and associated control information over a relatively broad downlink transmit beam 415 (e.g., which may be the same transmit beam over which the SS block was transmitted in the synchronization period 310 of FIG. 3A). Similarly, UEs 115-*e* and 115-*g* may receive the random access response over relatively broad downlink receive beams 420-*a* and 420-*b* (e.g., which may be the same receive beams over which the SS blocks were received in the synchronization period 310 of FIG. 3A). Additionally or alternatively, base station 105-*c* may transmit a contention resolution message with the random access response over transmit beam 415.

In addition to the random access response transmission and response, the base station 105-*c* and UEs 115-*e* and 115-*f* may perform beam refinement in order to identify an optimized beam pair for future communications. In order to support the beam refinement, base station 105-*c* may transmit reference signals over respective candidate downlink transmit beams 405. Similarly, the UEs 115-*e* and 115-*f* may attempt to receive the reference signals over multiple candidate downlink receive beams 410. For example, UE 115-*e* may perform a sweep over downlink receive beams 410-*a* and 410-*b* to receive the reference signal transmitted over downlink transmit beam 405-*a*. Additionally, UE 115-*e* may perform a sweep over downlink receive beams 410-*c* and 410-*d* to receive the reference signal transmitted over downlink transmit beam 405-*b*. Similarly, UE 115-*f* may perform a sweep over downlink receive beams 410-*e* and 410-*f* to receive the reference signal transmitted over downlink transmit beam 405-*c*. Additionally, UE 115-*f* may perform a sweep over downlink receive beams 410-*g* and 410-*h* to receive the reference signal transmitted over downlink transmit beam 405-*d*. Each UE 115 may identify an optimal downlink transmit beam 405 and downlink receive beam 410. The various candidate downlink transmit beams may be selected by the base station 105-*c* for beam refinement to establish optimized downlink transmit and receive beam pairs for each UE 115. The candidate beams may be the same width as the beams used for SS blocks. Alternatively, the candidate beams may be narrower or wider.

Each UE 115 may search for the random access response and reference signals over a given search window 425 after the transmission of its access request. For example, UE 115-*e* may search over search window 425-*a*, and UE 115-*f* may search over search window 425-*b* (e.g., UE 115-*e* may have transmitted its access request before UE 115-*f*). Although illustrated as different windows of time, search windows 425 for multiple UEs 115 may be the same (e.g., when access requests are transmitted in a same time period using different frequency resources or preamble identifiers). As illustrated, the search windows 425 may be segmented into time intervals 430 (e.g., which may be subframes in aspects of the present example, although other time divisions are also considered such as symbols, slots, mini-slots, and fractions thereof). For example, shorter search windows 425 may be employed for devices with power constraints.

Each time interval 430 may be segmented into a control region 465 and a data region 460. As an example, each control region 465 may contain a common search space 435 (e.g., which may be transmitted over broad downlink transmit beam 415 and received over a broad downlink receive beam 420). Downlink control information (DCI) in the common search space 435 may indicate the presence of reference signals and/or a random access response in the data region 460 of the corresponding time interval 430.

For example, time interval 430-*a* may contain common search space 435-*a*, which may include a DCI transmission indicating the presence of reference signals. In some examples, the DCI may be scrambled with an identifier associated with a random access response (e.g., random access radio network temporary identifier (RA-RNTI)). UE 115-*e* and UE 115-*f* may receive the control information (e.g., by detecting DCI scrambled with RA-RNTI) and identify reference signal resources 440-*a* within the data region 460 of time interval 430-*a*. As illustrated, reference signal resources 440-*a* may contain reference signals transmitted over respective candidate downlink transmit beams 405. As illustrated in FIG. 4, the reference signal resources 440-*a* may be shared by reference signals intended for multiple UEs 115. In some examples, the reference signal resources 440-*a* may be divided into different sets of reference signal resources, each associated with different sets of reference signals. For example, there may be N scrambling sequences, which are divided into M sets of N/M scrambling sequences, where each UE 115 may be assigned one of the M sets based on the set of resources used for the access request message. Additionally, there may be K reference signal resource locations (e.g., each associated with every Kth subcarrier), where K may be the same or different than M, in reference signal resources 440-*a*, such that each reference signal resource location may carry up to N/K reference signals transmitted concurrently. In one example, a single combined scrambling sequence may be defined, where each of the N scrambling sequences are indexed portions of the combined scrambling sequence.

DCI in common search space 435-*b* of time interval 430-*b* may indicate the presence of a random access response message 450 in time interval 430-*b*. Based on decoding the control information (e.g., which may also be scrambled with RA-RNTI), UEs 115-*e* and 115-*f* may process random access response 450. Like the control information, random access response message 450 may be transmitted over broad downlink transmit beam 415 and received over broad downlink receive beams 420. In some examples, the time interval 430-*b* may, instead of or in addition to time interval 430-*a*, include reference signal resources 440-*b*, which may be within a region of random access response 450, or in different time-frequency resources of time interval 430-*b*. As illustrated, reference signal resources 440-*b* may contain reference signals transmitted over respective candidate downlink transmit beams 405. In some cases, the presence of reference signal resources 440-*b* may be indicated by the same DCI in common search space 435-*b* that indicates the presence of the random access response message 450 or may be indicated by a separate DCI in the same or a former time interval within the search windows 425.

The reference signals transmitted over reference signal resources 440-*a* or 440-*b* may be scrambled (e.g., such that multiple reference signals may be transmitted over the same set of time-frequency resources). The scrambling sequences for each reference signal may be based on the PRACH resources with which the access request was transmitted. For example, each set of time-frequency resources and preamble identifier for an access request transmission may have an associated set of scrambling sequences (e.g., which may be known a priori to the UE 115, may be conveyed in a system information transmission, or may be configured for the UE 115 using dedicated signaling). Because each UE 115 knows the PRACH resources it used to transmit the access request, it may identify one or more potential scrambling sequences of the set with which reference signals intended for it are scrambled. Accordingly, upon identifying that a given time interval 430 contains reference signal resources 440, the UE 115 may attempt to descramble the reference signals based on the potential scrambling sequences. Upon successfully detecting a reference signal (e.g., based on a correlation with the expected sequence), the UE 115 may determine that the reference signal was intended for it and perform signal measurements accordingly. In the case that one or more reference signals are received over multiple candidate downlink receive beams 410, the signal quality of the reference signals received over downlink receive beams 410 may be evaluated.

The reference signals may be transmitted within the same time as the random access response as shown in time interval 430-*b*, before the random access response as shown in time interval 430-*a*, or in a time interval of the search window 425 after the random access response (not shown). Such flexibility may improve resource efficiency for the wireless communications system.

Figure 5:
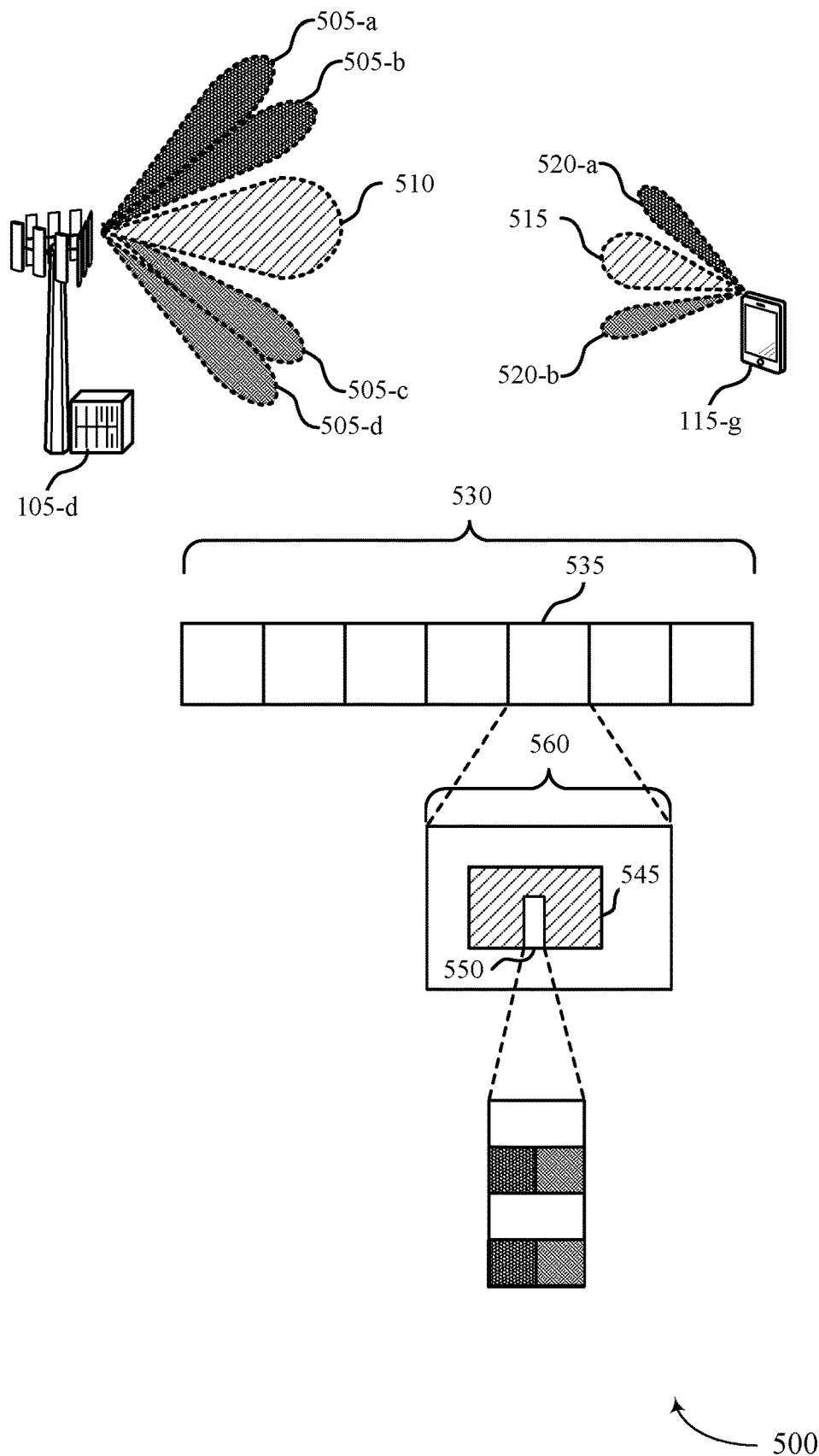
FIG. 5 illustrates an example of an access report configuration that supports scrambling sequences for reference signals during beam refinement in accordance with aspects of the present disclosure.

FIG. 5 illustrates an example of an access report configuration 500 that supports scrambling sequences for reference signals during beam refinement in accordance with various aspects of the present disclosure. In some examples, access report configuration 500 may implement aspects of wireless communications system 100. Access report configuration 500 includes base station 105-d and UE 115-g, each of which may be an example of the corresponding devices described above with reference to FIGS. 1-4.

After receiving the random access response and any associated reference signals, a UE 115 (e.g., UE 115-g) may transmit a report to base station 105-d. In some cases, a grant for the report may be contained within the random access response. The report may include information regarding a selected downlink candidate transmit beam 405, as described above with reference to FIG. 4, as well as any other relevant access information (e.g., a temporary identifier for the UE 115-g, etc.). As illustrated, the report may be transmitted from UE 115-g over broad uplink beam 515 and received by base station 105-d over broad uplink receive beam 510. In some cases, broad uplink receive beam 510 and broad uplink transmit beam 515 may be the same as or based on broad downlink transmit beam 410 and broad downlink receive beam 415, respectively, as described above with reference to FIG. 4.

Along with the access report, UE 115-g may transmit reference signals over respective uplink transmit beams 520-a and 520-b. Similarly, base station 105-d may receive reference signals over uplink receive beams 505. For example, base station 105-d may sweep over uplink receive beams 505-a and 505-b to receive a reference signal transmitted over uplink transmit beam 520-a. Additionally, base station 105-d may sweep over uplink receive beams 505-c and 505-d to receive a reference signal transmitted over uplink transmit beam 520-b. Accordingly, UE 115-g and base station 105-d may determine an optimal beam pair for uplink communications, which may or may not be the same as the optimal beam pair for downlink communications.

As mentioned above, the grant for the report may be included in the random access response. Accordingly, UE 115-g may determine, based on the random access response, a time interval 535 in which to transmit the report. UE 115-g may transmit the report over report resources 545 of a data region 560 of time interval 535. The uplink reference signals for uplink transmit beams 520-a and 520-b may be transmitted in a same time interval 535 as the report (e.g., as illustrated in FIG. 5) or before or after transmitting the report. For example, the random access response may provide an offset for the reference signals from the report. Additionally or alternatively, UE 115-g may be configured with a search window 530 in which to search for a grant for transmitting the reference signals.

UE 115-g may transmit uplink reference signals over reference signal resources 550. As illustrated, reference signal resources 550 may be divided in time and/or frequency. Multiple reference signals may be multiplexed over a given set of resources (e.g., using scrambling sequences). For example, scrambling sequences for the reference signals may be selected from a set of potential scrambling sequences, which may in turn be based on the PRACH resources over which the initial access request was transmitted. As an example, the set of potential scrambling sequences may be the same as the set of potential scrambling sequences for the downlink reference signals. Alternatively, the scrambling sequences for the uplink reference signals may be determined based on an identifier received from base station 105-d. For initial access, the identifier may be received in the random access response. For other access procedures (e.g., handover, beam recovery, access based on paging), the identifier may be received in other communications such as a handover command. For example, there may be N scrambling sequences for the uplink reference signals, which are divided into M sets of N/M scrambling sequences, where each UE 115 may be assigned one of the M sets based on an identifier received in the random access response or the set of resources used for the access request message. There may be K reference signal resource locations (e.g., each associated with every Kth subcarrier), where K may be the same or different than M, in reference signal resources 550, such that each reference signal resource location may carry up to N/K reference signals transmitted concurrently. In one example, a single combined scrambling sequence may be defined, where each of the N scrambling sequences are indexed portions of the combined scrambling sequence.

Figure 6:
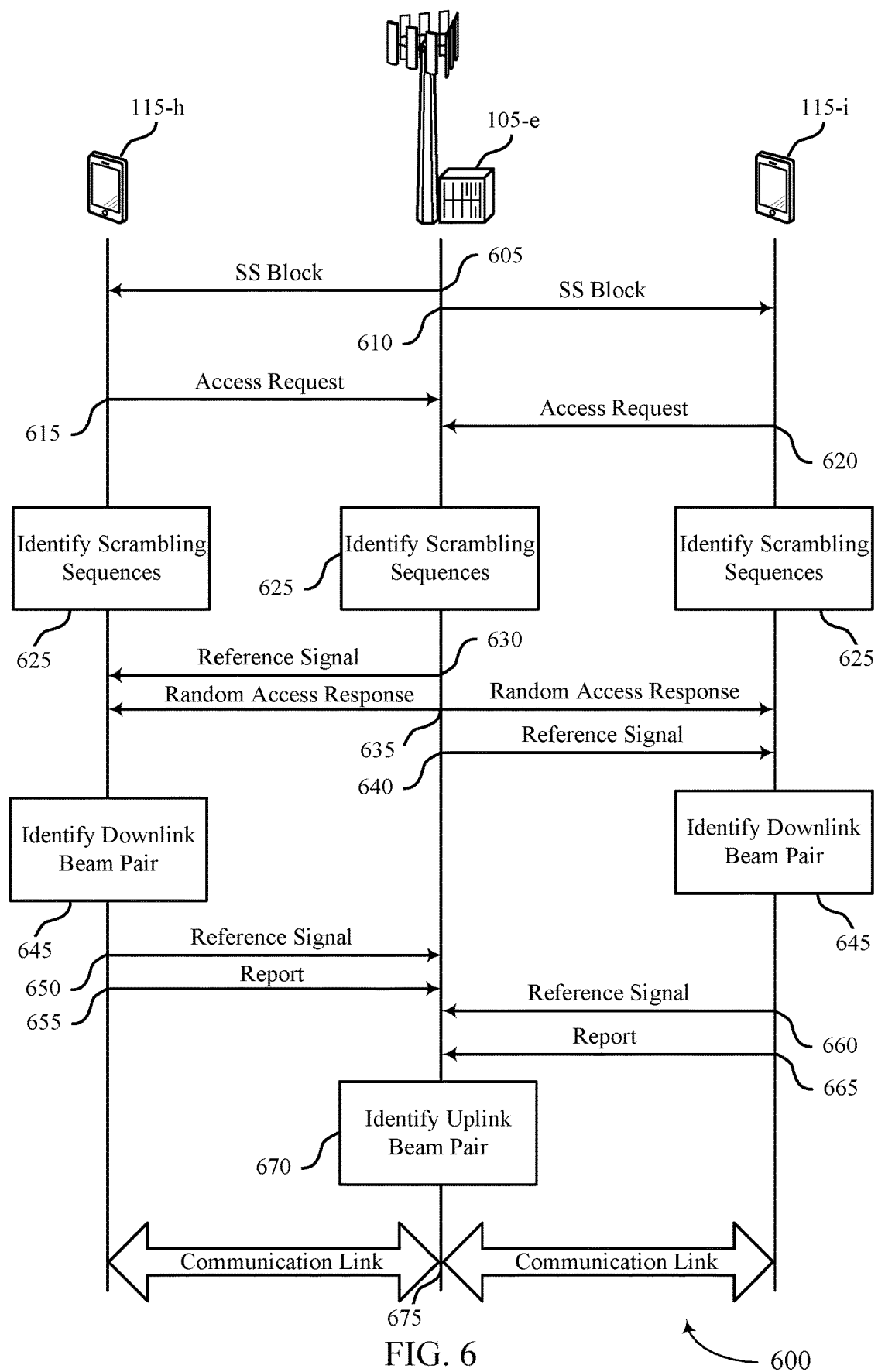
FIG. 6 illustrates an example of a process flow that supports scrambling sequences for reference signals during beam refinement in accordance with aspects of the present disclosure.

FIG. 6 illustrates an example of a process flow 600 that supports scrambling sequences for reference signals during beam refinement in accordance with various aspects of the present disclosure. Process flow 600 includes base station 105-e and UEs 115-h and 115-i, each of which may be an example of the corresponding devices described above with reference to FIGS. 1-5.

At 605, base station 105-e may transmit (e.g., and UE 115-h may receive) an SS block over a relatively coarse beam. Additionally, at 610, base station 105-e may transmit (e.g., and UE 115-i may receive) an SS block over another coarse beam. Base station 105-e may transmit the SS blocks at 605 and 610 within a synchronization period, as described above with reference to FIG. 3. For example, base station 105-e may transmit the SS blocks at 605 and 610 sequentially (e.g., in a beamswept fashion, as illustrated) or simultaneously. Thus, the respective SS blocks may be associated with different sets of time-frequency resources.

At 615, UE 115-h may transmit (e.g., and base station 105-e may receive) an access request. Similarly, at 620, UE 115-i may transmit (e.g., and base station 105-e may receive) an access request. As with the SS blocks, the access requests may be transmitted and received over relatively broad beams. In some aspects, each access request may be transmitted over a respective set of PRACH resources including time-frequency resources and a preamble identifier. The PRACH resources may be based on the resources over which the respective SS blocks were received. For example, a given SS block may have a designated set of time-frequency resources and set of preamble identifiers over which any devices selecting the beam associated with the SS block may transmit an access request. The access requests may be transmitted at the same time or at different times (e.g., as illustrated). In some cases, UE 115-h or UE 115-i may transmit a second message accompanying the access request. For example, UE 115-h or UE 115-i may transmit the second message in a set of resources that overlap or are distinct from the set of PRACH resources. The second message may, for example, convey information such as the UE ID, and may be used in contention resolution. In some examples, the resources or scrambling for the second message may be based on the set of PRACH resources. For example, the second message may be scrambled based on the preamble identifier (e.g., using a scrambling code that is selected based on the preamble identifier). As another example, the time-frequency resources for the second message may be based on the time-frequency resources used for the access request, or may be based on the preamble identifier.

At 625, base station 105-e (e.g., and UEs 115-h and 115-i) may identify one or more sets of scrambling sequences based on the PRACH resources over which the respective access requests were transmitted. For example, the PRACH resources of the access request received at 615 may be associated with a first set of scrambling sequences, while the PRACH resources of the access request received at 620 may be associated with a second set of scrambling sequences. In some cases, base station 105-e and UEs 115-h and 115-i may identify sets of downlink scrambling sequences and uplink scrambling sequences at 625. In some cases, the sets of downlink and uplink scrambling sequences may be the same. Where the UE 115-h or UE 115-i transmits a second message with the access request, the set of scrambling sequences identified by the UE 115-h or UE 115-i may be further based on information conveyed by the second message (e.g., UE ID).

At 635, base station 105-e may transmit (e.g., and UEs 115-h and 115-i may receive) a random access response. The random access response may be transmitted and received over a broad beam (e.g., which may be the same as the beams over which the SS block was transmitted and received, respectively). The random access response may include respective grants of uplink resources over which UEs 115-h and 115-i may transmit feedback reports (e.g., at 655 and 660, as described below). In some cases, the random access response is transmitted within a response window after the reception of the first access request (e.g., which may alternatively be referred to as a random access message) at 615 and within a second response window after the reception of the second access request at 620.

Along with the random access response, base station 105-e may transmit a reference signal scrambled with one of the downlink scrambling sequences of the first set of scrambling sequences to UE 115-h at 630. Although illustrated as occurring before the random access response, it is to be understood that the reference signal may be transmitted before, during, or after the random access response. In some cases, a TTI for transmitting the reference signal may be indicated in a DCI transmission. Additionally, though only one reference signal is shown, multiple reference signals may be transmitted. Each reference signal may be associated with a relatively narrow transmit beam and received over one or more relatively narrow receive beams of UE 115-h (e.g., UE 115-h may sweep receive beams to detect the reference signals).

Similarly, base station 105-e may transmit a reference signal scrambled with one of the downlink scrambling sequences of the second set of scrambling sequences to UE 115-i at 640. Although illustrated as occurring after the random access response, it is to be understood that the reference signal may be transmitted before, during, or after the random access response. In some cases, a TTI for transmitting the reference signal may be indicated in a DCI transmission that is separate from the DCI associated with the random access response (e.g., also scrambled with RA-RNTI). Additionally, though only one reference signal is shown, multiple reference signals may be transmitted. Each reference signal may be associated with a relatively narrow transmit beam and received over one or more relatively narrow receive beams of UE 115-i (e.g., UE 115-i may sweep receive beams to detect the reference signals).

At 645, UEs 115-h and 115-i may identify respective downlink beam pairs based on the reference signals. For example, UE 115-h may identify an optimized downlink transmit beam and downlink receive beam (e.g., downlink beam pair). Similar identification may be performed at UE 115-i. The identifications may be based on measurements (e.g., reference signal received power (RSRP), signal-to-noise ratio (SNR), etc.) of the various reference signals performed at the respective UEs 115.

At 650, UE 115-h may transmit an uplink reference signal and at 655 may also transmit a report. In some cases, the report transmitted at 655 may be transmitted over a relatively broad beam (e.g., the same beam used to transmit the access request at 615). The report may include an indication of the identified downlink beam pair. In some cases, the report may be transmitted with an initial layer-3 message. The initial layer-3 message may convey, for example, the UE ID, and may be used for contention resolution. As with the downlink reference signals, one or more uplink reference signals may be transmitted at 650, and the uplink reference signals may occur before, during, and/or after the report at 655. The uplink reference signals may be scrambled with a scrambling sequence from the first set of scrambling sequences identified at 625. Additionally or alternatively, the scrambling sequences for the uplink reference signals may be indicated by an indicator in the random access response received at 635. In some cases, a TTI for transmission of the uplink reference signals may be indicated in the random access response received at 635.

Similarly, at 660, UE 115-i may transmit an uplink reference signal and at 665 may transmit a report. In some cases, the report transmitted at 665 may be transmitted over a relatively broad beam (e.g., the same beam used to transmit the access request at 620). The report may include an indication of the identified downlink beam pair. As with the downlink reference signals, one or more uplink reference signals may be transmitted at 665, and the uplink reference signals may occur before, during, and/or after the report at 660. The uplink reference signals may be scrambled with a scrambling sequence from the second set of scrambling sequences identified at 625. Additionally or alternatively, the scrambling sequences for the uplink reference signals may be indicated by an indicator in the random access response received at 635. In some cases, a TTI for transmission of the uplink reference signals may be indicated in the random access response received at 635.

At 670, base station 105-e may identify an uplink beam pair for communication with each UE 115 based on the uplink reference signals. For example, base station 105-e may identify an optimized uplink transmit beam and uplink receive beam from the reference signals from UE 115-h. Similar identification may be performed for UE 115-i.

At 675, base station 105-e may independently establish communication links with UE 115-h and UE 115-i. The respective communication links may use the downlink beam pairs identified at 645 and the uplink beam pairs identified at 670.

Figure 7:
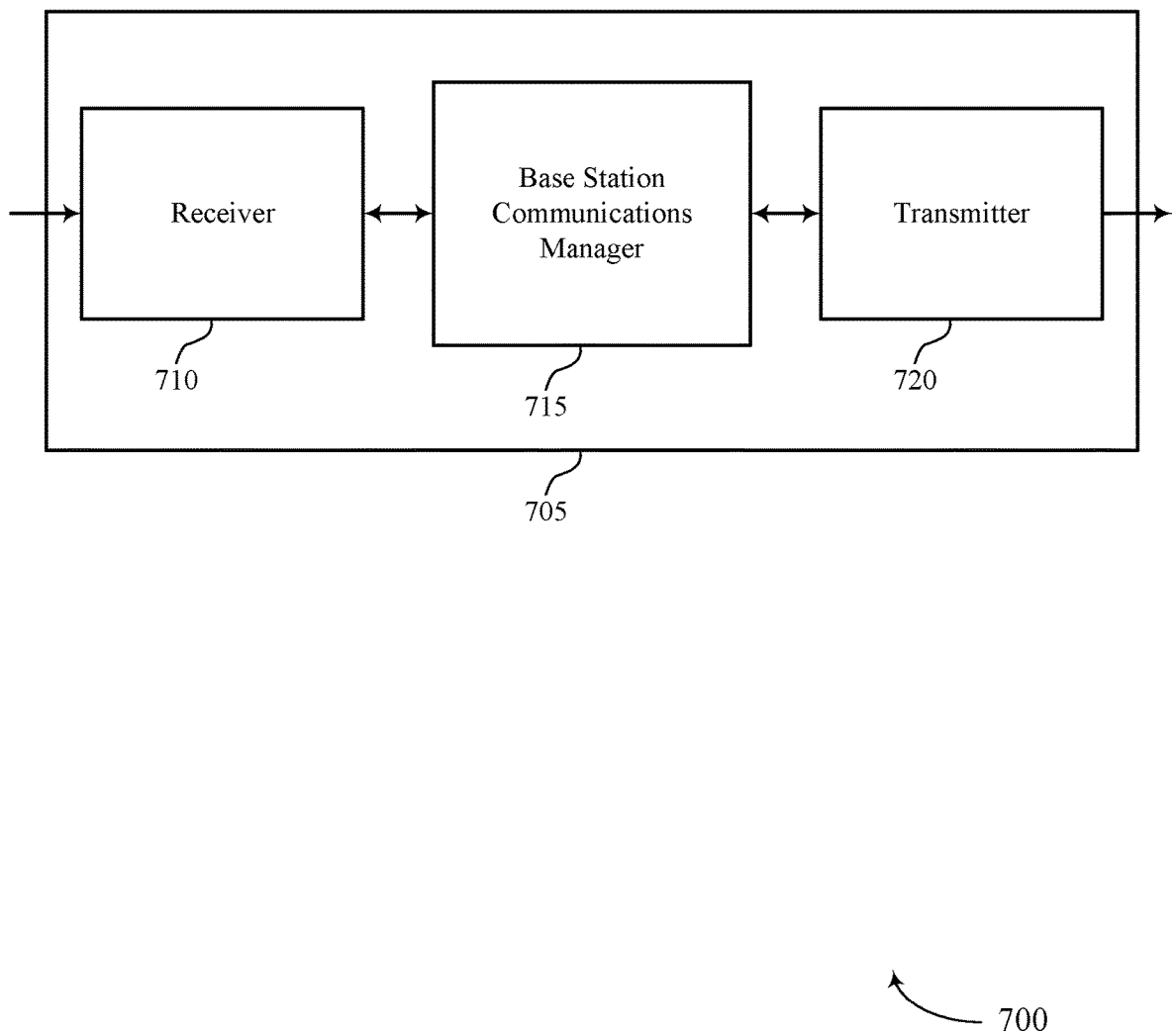
FIGS. 7 through 9 show block diagrams of a device that supports scrambling sequences for reference signals during beam refinement in accordance with aspects of the present disclosure.

FIG. 7 shows a block diagram 700 of a wireless device 705 that supports scrambling sequences for reference signals during beam refinement in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to scrambling sequences for reference signals during beam refinement). Information may be passed on to other components of the device. The receiver 710 may be an example of aspects of the transceiver 1035 described with reference to FIG. 10. The receiver 710 may utilize a single antenna or a set of antennas.

Base station communications manager 715 may be an example of aspects of the base station communications manager 1015 described with reference to FIG. 10. Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may receive a first random access message from a first UE over a first set of resources; transmit, in a first transmission time interval in response to the first random access message, one or more downlink beam reference signals scrambled with respective downlink scrambling sequences of a set of downlink scrambling sequences; and receive first channel feedback information from the first UE. In some cases, the set of downlink scrambling sequences selected from a set of sets of downlink scrambling sequences is based on the first set of resources. Additionally, in some aspects, the first channel feedback information is based on measurements of the downlink beam reference signals.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
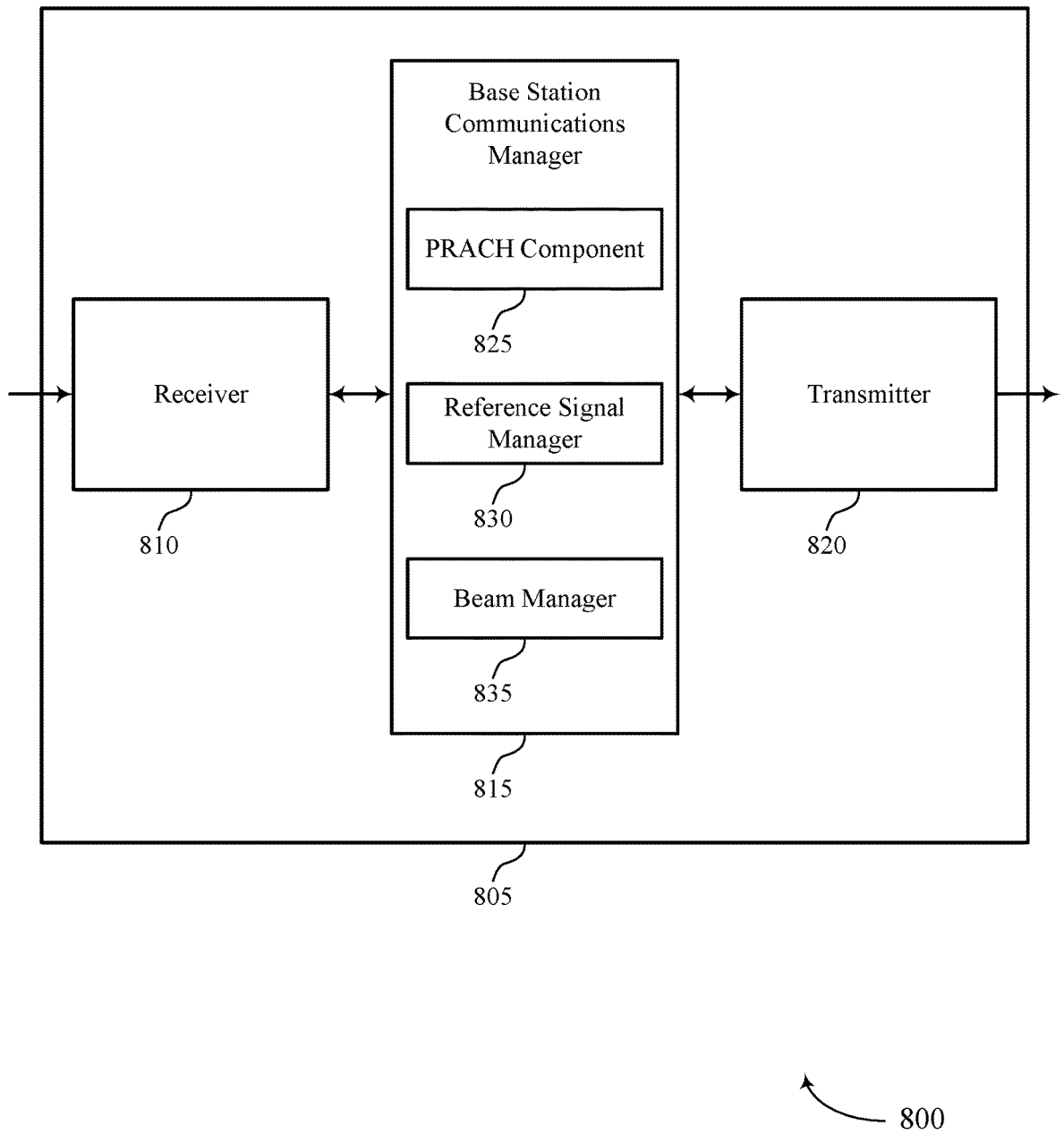

FIG. 8 shows a block diagram 800 of a wireless device 805 that supports scrambling sequences for reference signals during beam refinement in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to scrambling sequences for reference signals during beam refinement, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10. Base station communications manager 815 may also include PRACH component 825, reference signal manager 830, and beam manager 835.

PRACH component 825 may receive a first random access message from a first UE over a first set of resources. Additionally, PRACH component 825 may receive a second random access message from a second UE over the first set of resources or a second set of resources. In some cases, the first and second sets of resources include time resources, frequency resources, preamble resources, or a combination thereof.

Reference signal manager 830 may transmit, in a first TTI in response to the first random access message, one or more downlink beam reference signals scrambled with respective downlink scrambling sequences of a set of downlink scrambling sequences. Reference signal manager 830 may select the set of downlink scrambling sequences from a set of sets of downlink scrambling sequences based on the first set of resources. In some cases, reference signal manager 830 may identify a set of uplink scrambling sequences for one or more candidate uplink beam reference signals and receive the one or more candidate uplink beam reference signals scrambled with respective ones of the set of uplink scrambling sequences. Reference signal manager 830 may transmit, in the first TTI in response to the second random access message, one or more second downlink beam reference signals scrambled with respective downlink scrambling sequences of a second set of downlink scrambling sequences. The second set of downlink scrambling sequences may be selected from the plurality of sets of downlink scrambling sequences based on the second set of resources. Reference signal manager 830 may identify time and frequency resources for the one or more downlink beam reference signals based on the first set of resources. In some cases, the set of uplink scrambling sequences is identified based on the first set of resources, an indicator transmitted in a random access response to the first random access message, a second indicator transmitted in a handover command, or some combination thereof. In some cases, the random access response includes an indicator of a third TTI for transmission of candidate uplink beam reference signals from the first UE. In some cases, the random access response includes a second indicator of a fourth TTI for transmission of second uplink beam reference signals from the second UE. Additionally or alternatively, reference signal manager 830 may receive a data message from the first UE based on the first random access message, where the set of downlink scrambling sequences are determined based on information within the data message.

Beam manager 835 may receive first channel feedback information from the first UE, where the first channel feedback information is based on measurements of the downlink beam reference signals. Beam manager 835 may send one or more transmissions to the first UE via a candidate downlink transmit beam selected based on the first channel feedback information. Beam manager 835 may receive second channel feedback information from the second UE, where the second channel feedback information is based on measurements of the second downlink beam reference signals. In some cases, beam manager 835 may receive second channel feedback information from the second UE, where the second channel feedback information is based on measurements of the downlink beam reference signals.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
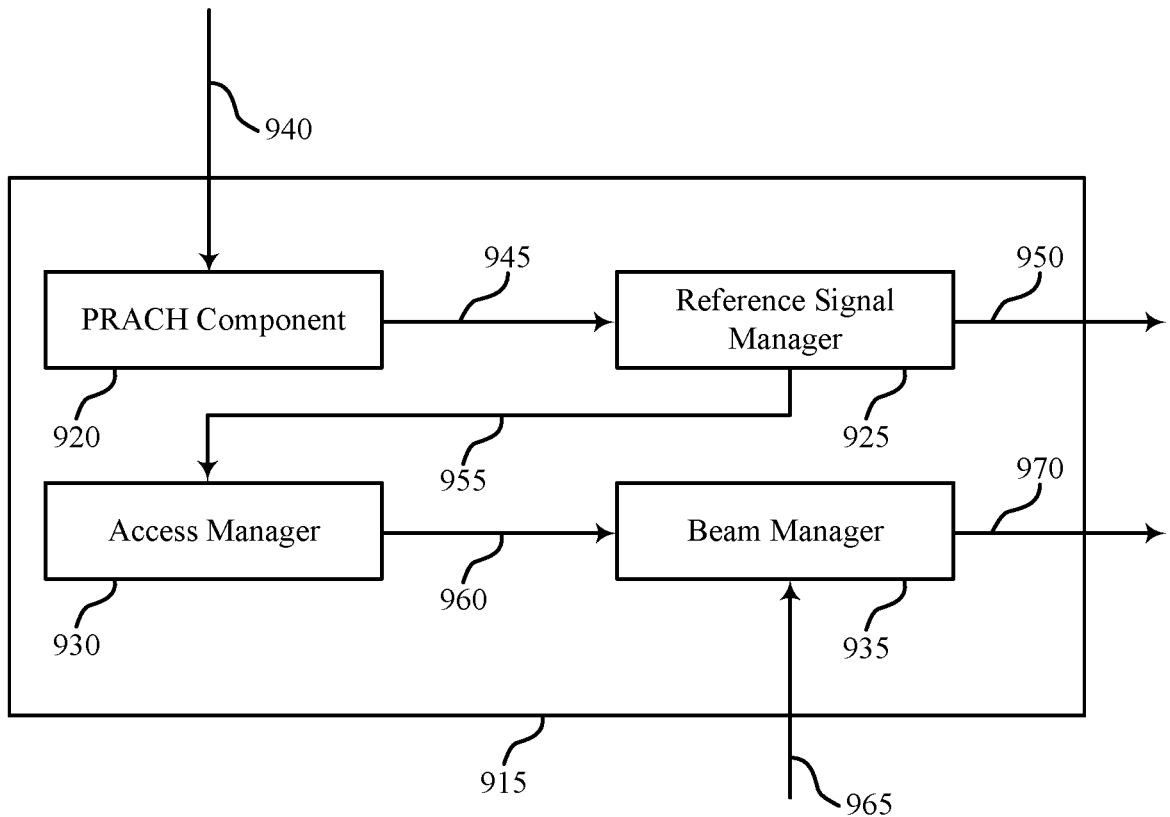

FIG. 9 shows a block diagram 900 of a base station communications manager 915 that supports scrambling sequences for reference signals during beam refinement in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include PRACH component 920, reference signal manager 925, access manager 930, and beam manager 935. Each of these modules may communicate, directly or indirectly, with one another (e.g., via one or more buses).

PRACH component 920 may receive signal 940 (e.g., via a receiver 710 or 810), and may identify random access messages within a portion (e.g., a random access channel) of the signal 940 (e.g., by correlating for random access sequences, or demodulation and decoding of the signal 940). In some cases, PRACH component 920 may receive a first random access message from a first UE over a first set of resources. Additionally, PRACH component 920 may receive a second random access message from a second UE over the first set of resources or a second set of resources. In some cases, the first and second sets of resources include time resources, frequency resources, preamble resources, or a combination thereof. PRACH component 920 may pass information 945 indicating the first and/or second sets of resources that the random access messages are received over to reference signal manager 925.

Reference signal manager 925 may transmit, in a first TTI in response to the first random access message, one or more downlink beam reference signals scrambled with respective downlink scrambling sequences of a set of downlink scrambling sequences. For example, reference signal manager 925 may pass signal 950 to a transmitter 720 or 820 including the one or more scrambled downlink beam reference signals for transmission in time-frequency resources over which the scrambled downlink reference signals are to be transmitted. Reference signal manager 925 may select the set of downlink scrambling sequences from a set of sets of downlink scrambling sequences based on the first set of resources. In some cases, reference signal manager 925 may identify a set of uplink scrambling sequences for one or more candidate uplink beam reference signals and receive the one or more candidate uplink beam reference signals scrambled with respective ones of the set of uplink scrambling sequences.

Additionally, reference signal manager 925 may transmit, in the first TTI in response to the second random access message, one or more second downlink beam reference signals scrambled with respective downlink scrambling sequences of a second set of downlink scrambling sequences. The second set of downlink scrambling sequences may be selected from the plurality of sets of downlink scrambling sequences based on the second set of resources. Reference signal manager 925 may identify time and frequency resources for the one or more downlink beam reference signals based on the first set of resources from information 945. In some cases, the set of uplink scrambling sequences is identified based on the first set of resources, an indicator transmitted in a random access response to the first random access message, a second indicator transmitted in a handover command, or some combination thereof. In some cases, the random access response includes an indicator of a third TTI for transmission of uplink candidate beam reference signals from the first UE. In some cases, the random access response includes a second indicator of a fourth TTI for transmission of second uplink beam reference signals from the second UE. Additionally or alternatively, reference signal manager 925 may receive a data message from the first UE (e.g., via a receiver 710 or 810) based on the first random access message, where the set of downlink scrambling sequences are determined based on information within the data message. Reference signal manager 925 may downlink beam reference signal information 955 indicating the downlink beam reference signals that the UE may measure and, accordingly, report on.

Access manager 930 may transmit (e.g., via a transmitter 720 or 820), in a second TTI, a random access response to the first and second UEs, the random access response including respective grants of uplink resources for first and second channel feedback information. Access manager 930 may indicate, in a downlink control information transmission, a first TTI for the transmitting of the one or more downlink beam reference signals and the one or more second downlink beam reference signals based on downlink beam reference signal information 955. In some cases, the random access response is transmitted within a first response window after the reception of the first random access message and within a second response window after the reception of the second random access message, where the random access message are received via signal 940. In some cases, the first TTI is prior to the second TTI or subsequent to the second TTI. In some cases, the first TTI and the second TTI are a same TTI. Access manager may send uplink resource information 960 indicating the uplink resources included in the grants for the first and second channel feedback information.

Beam manager 935 may receive the first channel feedback information from the first UE, where the first channel feedback information is based on measurements of the downlink beam reference signals. For example, beam manager 935 may receive a signal 965 and may demodulate and decode the signal to determine the first channel feedback information. Beam manager 935 may configure transmissions to be sent to the first UE via a candidate downlink transmit beam selected based on the first channel feedback information. For example, beam manager 935 may pass beam information 970 to a transmitter 720 or 820 indicating one or more downlink transmit beams. Beam manager 935 may receive the second channel feedback information from the second UE, where the second channel feedback information is based on measurements of the second downlink beam reference signals. Additionally or alternatively, the second channel feedback information may be based on measurements of the first and second downlink beam reference signals. For example, similar to the process described above, beam manager 935 may receive a signal 965 and may demodulate and decode the signal to determine the second channel feedback information.

Figure 10:
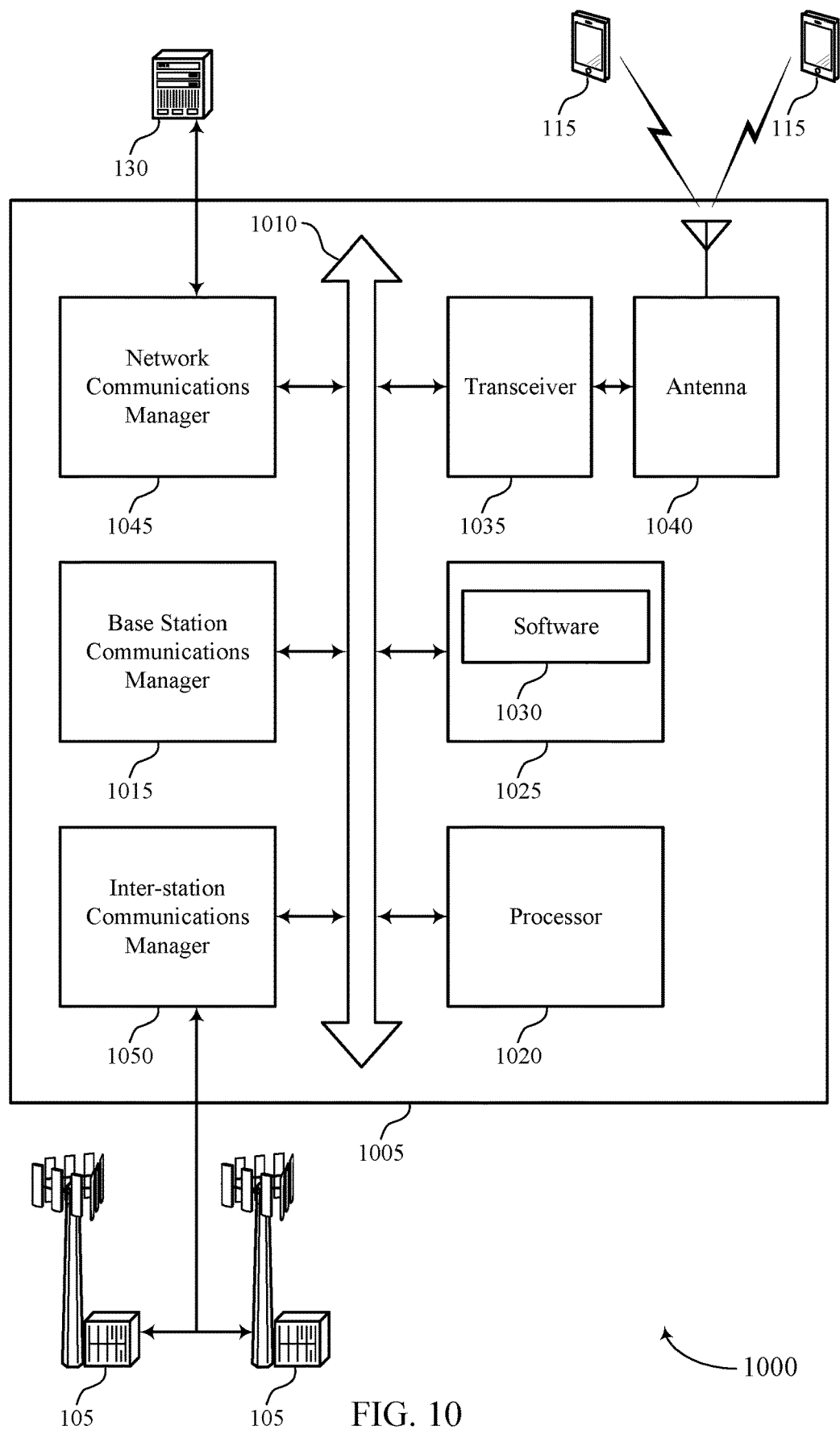
FIG. 10 illustrates a block diagram of a system including a base station that supports scrambling sequences for reference signals during beam refinement in accordance with aspects of the present disclosure.

FIG. 10 shows a diagram of a system 1000 including a device 1005 that supports scrambling sequences for reference signals during beam refinement in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting scrambling sequences for reference signals during beam refinement).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support scrambling sequences for reference signals during beam refinement. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases the device may have more than one antenna 1040, which may be capable of concurrently transmitting or receiving multiple wireless transmissions.

Network communications manager 1045 may manage communications with the core network 130 (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
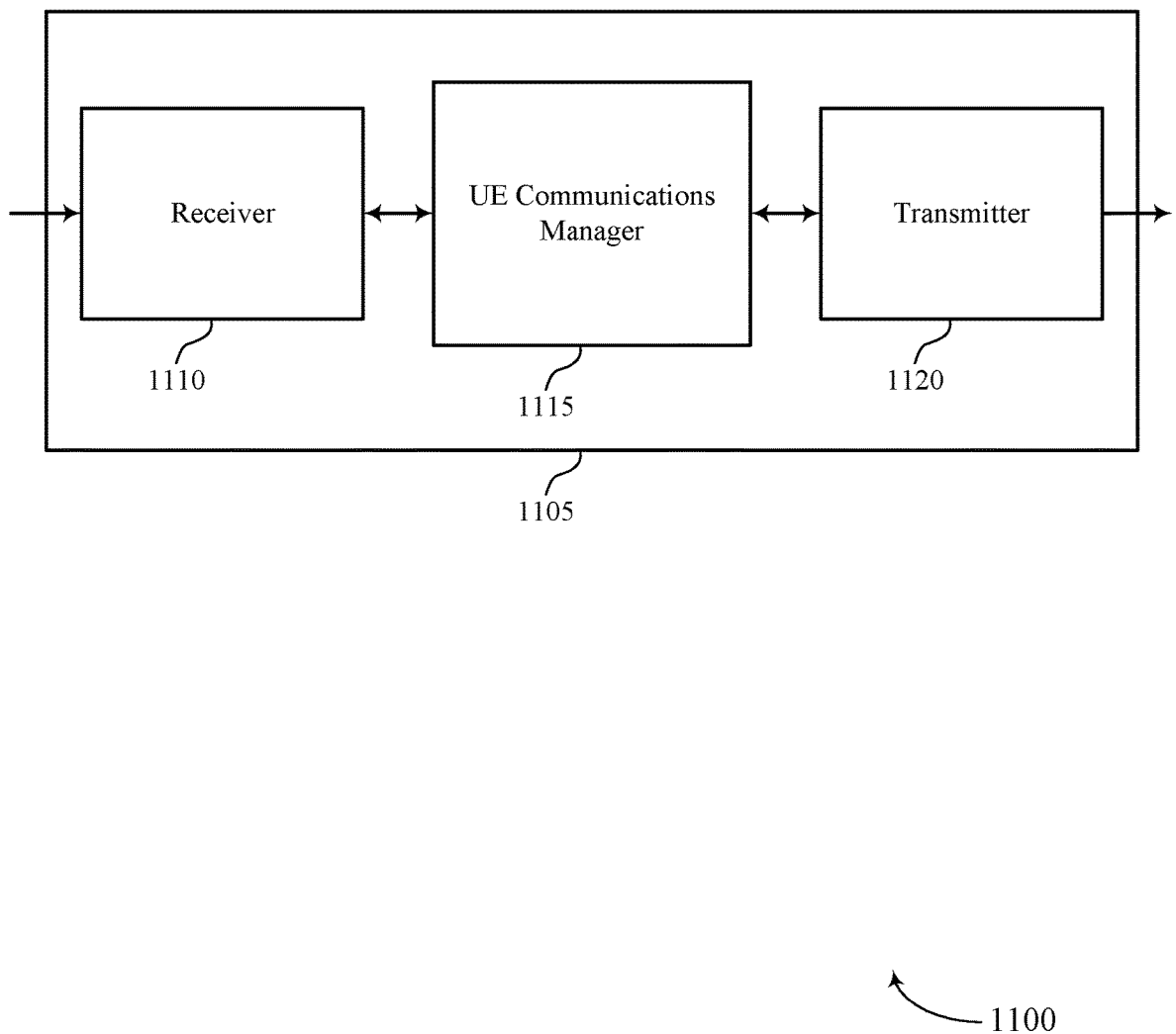
FIGS. 11 through 13 show block diagrams of a device that supports scrambling sequences for reference signals during beam refinement in accordance with aspects of the present disclosure.

FIG. 11 shows a block diagram 1100 of a wireless device 1105 that supports scrambling sequences for reference signals during beam refinement in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to scrambling sequences for reference signals during beam refinement, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14. UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may identify a downlink transmit beam of a set of downlink transmit beams for synchronization signals transmitted by a base station; transmit a random access message using a first set of resources, the first set of resources being selected based on the identified downlink transmit beam; receive, in response to the random access message, one or more downlink beam reference signals scrambled with respective downlink scrambling sequences of a set of downlink scrambling sequences, the set of downlink scrambling sequences selected from a set of sets of downlink scrambling sequences based on the first set of resources; and transmit channel feedback information based on measurements of the downlink beam reference signals.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
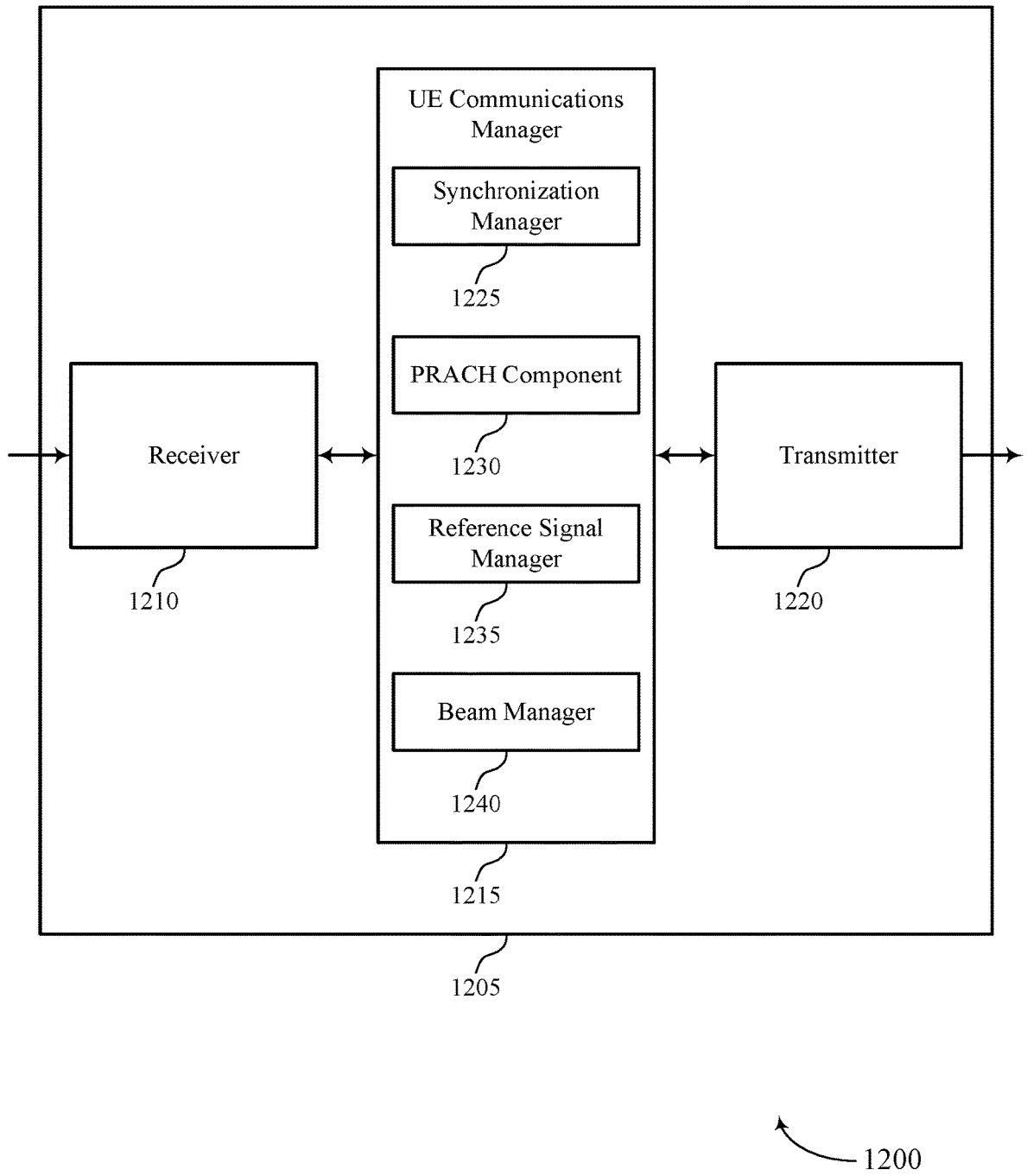

FIG. 12 shows a block diagram 1200 of a wireless device 1205 that supports scrambling sequences for reference signals during beam refinement in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to scrambling sequences for reference signals during beam refinement, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14. UE communications manager 1215 may also include synchronization manager 1225, PRACH component 1230, reference signal manager 1235, and beam manager 1240.

Synchronization manager 1225 may identify a downlink transmit beam of a set of downlink transmit beams for synchronization signals transmitted by a base station.

PRACH component 1230 may transmit a random access message using a first set of resources. In some cases, the first set of resources may be selected based on the identified downlink transmit beam. The first set of resources may include time resources, frequency resources, preamble resources, or a combination thereof.

Reference signal manager 1235 may receive, in response to the random access message, one or more downlink beam reference signals scrambled with respective downlink scrambling sequences of a set of downlink scrambling sequences, the set of downlink scrambling sequences selected from a set of sets of downlink scrambling sequences based on the first set of resources. Reference signal manager 1235 may identify a set of uplink scrambling sequences for one or more candidate uplink beam reference signals from a set of sets of uplink scrambling sequences. In some cases, reference signal manager 1235 may transmit the one or more candidate uplink beam reference signals scrambled with respective ones of the set of uplink scrambling sequences. Reference signal manager 1235 may identify a second TTI for the receiving of the one or more downlink beam reference signals based on a downlink control information transmission. In some cases, reference signal manager 1235 may identify time and frequency resources for the one or more downlink beam reference signals based on the first set of resources. In some cases, the set of uplink scrambling sequences is identified based on the first set of resources or an indicator received in a random access response to the random access message. In some cases, the second TTI is prior to a first TTI or subsequent to the first TTI. In some cases, the second TTI and the first TTI are a same TTI.

Beam manager 1240 may transmit channel feedback information based on measurements of the downlink beam reference signals and receive one or more transmissions from the base station via a downlink beam pair including a candidate downlink transmit beam and a candidate downlink receive beam, the downlink beam pair selected based on the channel feedback information.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
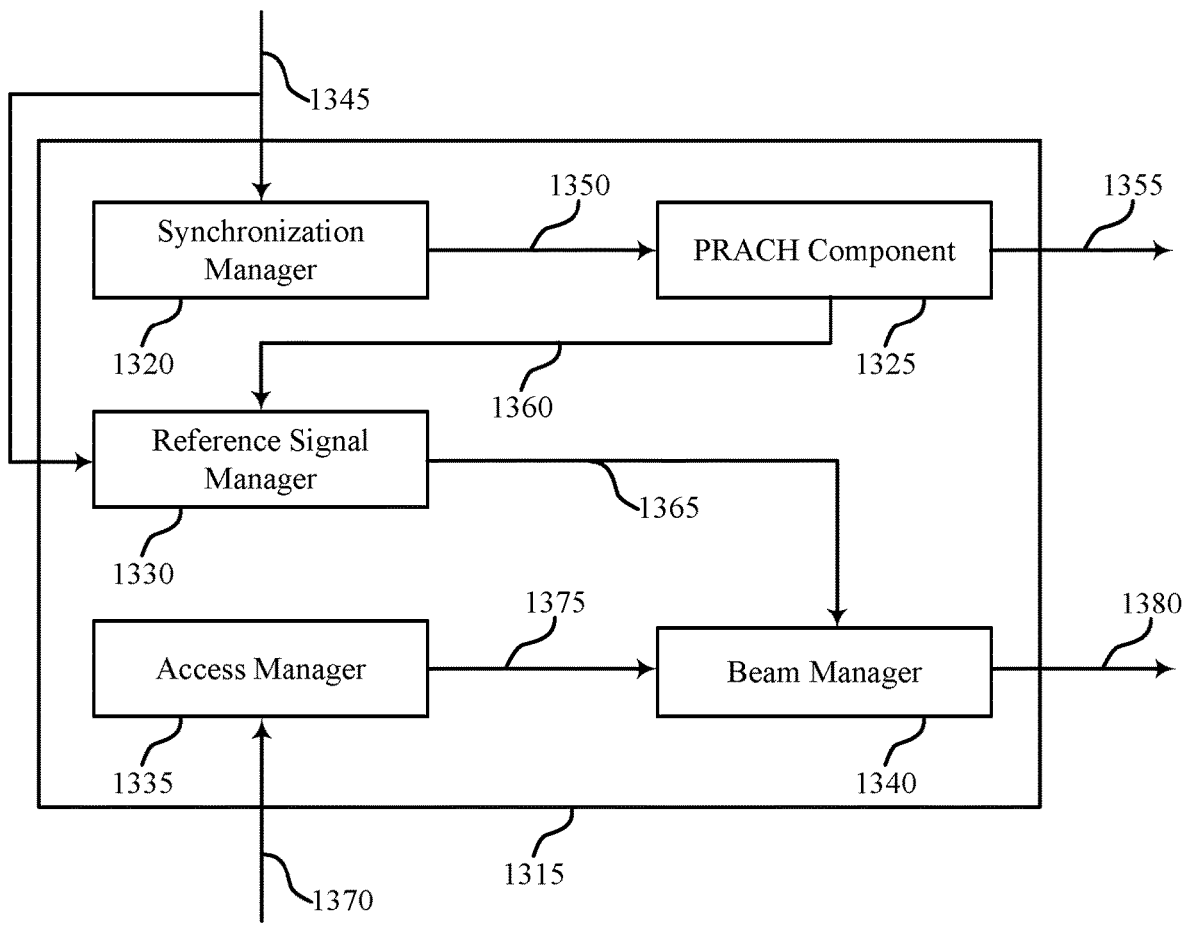

FIG. 13 shows a block diagram 1300 of a UE communications manager 1315 that supports scrambling sequences for reference signals during beam refinement in accordance with aspects of the present disclosure. The UE communications manager 1315 may be an example of aspects of a UE communications manager 1415 described with reference to FIGS. 11, 12, and 14. The UE communications manager 1315 may include synchronization manager 1320, PRACH component 1325, reference signal manager 1330, access manager 1335, and beam manager 1340. Each of these modules may communicate, directly or indirectly, with one another (e.g., via one or more buses).

Synchronization manager 1320 may identify a downlink transmit beam of a set of downlink transmit beams for synchronization signals transmitted by a base station. For example, synchronization manager 1320 may receive a signal 1345 (e.g., via receiver 1110 or 1210) over one or more downlink transmit beams and identify one of the downlink transmit beams from the one or more downlink transmit beams based on a measurement (e.g., signal quality or signal strength). Synchronization manager may then send beam selection information 1350 indicating the identified downlink transmit beam to PRACH component 1325.

PRACH component 1325 may transmit a random access message using a first set of resources. For example, PRACH component 1325 may transmit signal 1355 (e.g., via transmitter 1120 or 1220) by encoding bits indicating the random access message, identify the first set of resources over which the random access message is to be transmitted, and modulate the transmission over the identified first set of resources. In some cases, the first set of resources may be selected based on the identified downlink transmit beam from beam selection information 1350. The first set of resources may include time resources, frequency resources, preamble resources, or a combination thereof. PRACH component 1325 may send random access message information 1360 indicating the random access message transmitted in signal 1355 and the first set of resources that signal 1355 is transmitted on to reference signal manager 1330.

Reference signal manager 1330 may receive (e.g., in signal 1345 from receiver 1110 or 1120), in response to the random access message, one or more downlink beam reference signals scrambled with respective downlink scrambling sequences of a set of downlink scrambling sequences, the set of downlink scrambling sequences selected from a set of sets of downlink scrambling sequences based on the first set of resources. Reference signal manager 1330 may identify a set of uplink scrambling sequences for one or more candidate uplink beam reference signals from a set of sets of uplink scrambling sequences. In some cases, reference signal manager 1330 may transmit the one or more candidate uplink beam reference signals scrambled with respective ones of the set of uplink scrambling sequences. Reference signal manager 1330 may identify a second TTI for the receiving of the one or more downlink beam reference signals based on a downlink control information transmission. In some cases, reference signal manager 1330 may identify time and frequency resources for the one or more downlink beam reference signals based on the first set of resources (e.g., based on random access message information 1360). In some cases, the set of uplink scrambling sequences is identified based on the first set of resources (e.g., based on random access message information 1360) or an indicator received in a random access response to the random access message. In some cases, the second TTI is prior to a first TTI or subsequent to the first TTI. In some cases, the second TTI and the first TTI are a same TTI. Reference signal manager 1330 may perform measurements on the one or more downlink beam reference signals and send beam measurement information 1365 to beam manager 1340.

Access manager 1335 may receive, in a first TTI, a random access response to the random access message, the random access response including a grant of uplink resources for channel feedback information. For example, access manager 1335 may receive (e.g., via receiver 1110 or 1210) a control information signal 1370 and may demodulate and decode the signal to determine the random access response. In some cases, the random access response is received within a response window after the transmission of the random access message. In some cases, the random access response includes an indicator of the second TTI for transmission of candidate uplink beam reference signals. Access manager 1335 may send uplink resource information 1375 indicating the uplink resources determined from control information signal 1370 for the channel feedback information to beam manager 1340.

Beam manager 1340 may transmit the channel feedback information based on measurements of the downlink beam reference signals. In some cases, the channel feedback information may be transmitted on the uplink resources indicated in uplink resource information 1375. For example, beam manager 1340 may transmit signal 1380 (e.g., via transmitter 1120 or 1220) by encoding bits indicating the channel feedback information, identify the uplink resources (e.g., based on uplink resource information 1375) over which the channel feedback information is to be transmitted, and modulate the transmission over the identified uplink resources. Additionally, beam manager 1340 may receive one or more transmissions from the base station via a downlink beam pair including a candidate downlink transmit beam and a candidate downlink receive beam, the downlink beam pair selected based on the channel feedback information.

Figure 14:
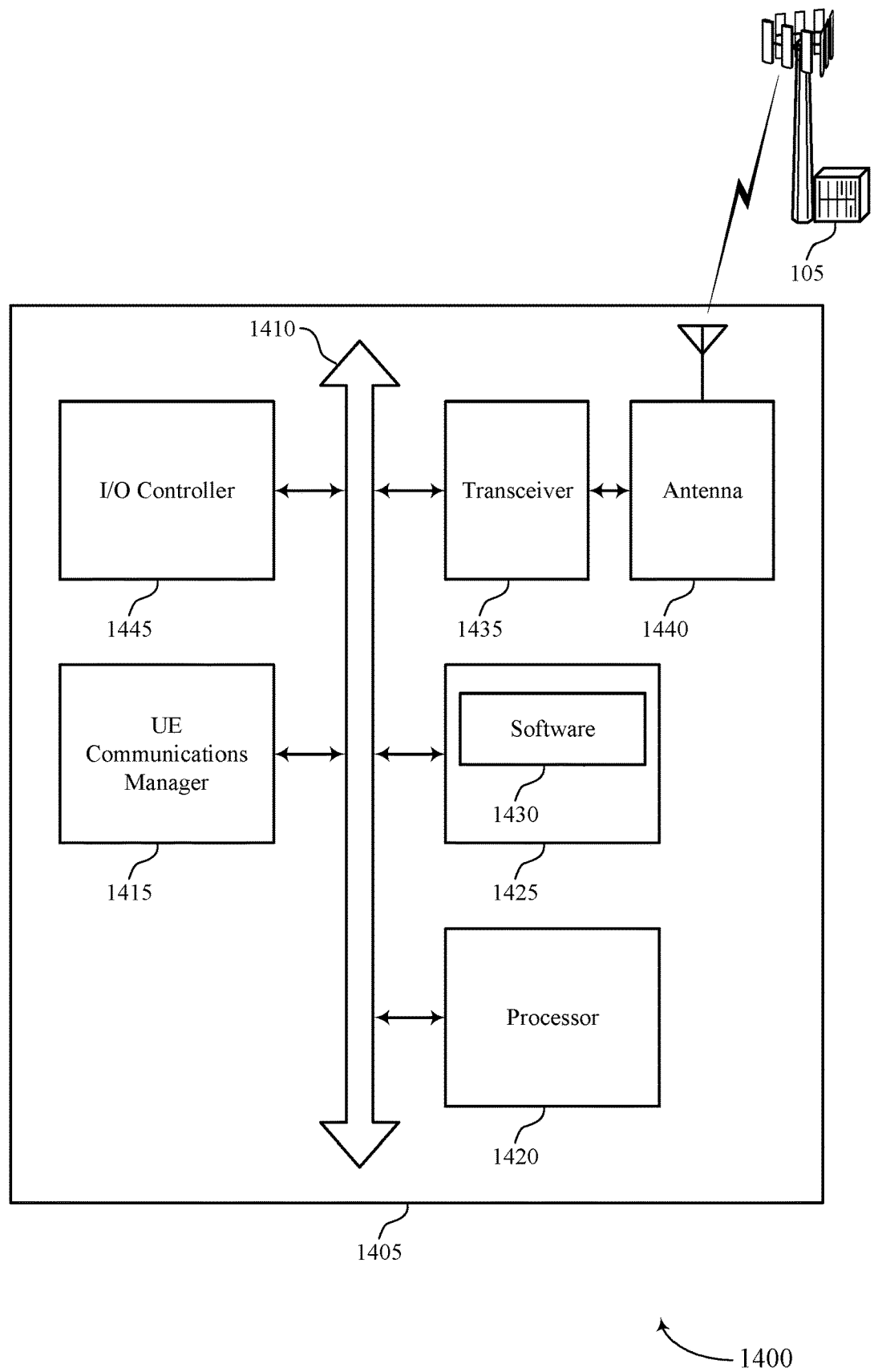
FIG. 14 illustrates a block diagram of a system including a user equipment (UE) that supports scrambling sequences for reference signals during beam refinement in accordance with aspects of the present disclosure.

FIG. 14 shows a diagram of a system 1400 including a device 1405 that supports scrambling sequences for reference signals during beam refinement in accordance with aspects of the present disclosure. Device 1405 may be an example of or include the components of UE 115 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting scrambling sequences for reference signals during beam refinement).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support scrambling sequences for reference signals during beam refinement. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
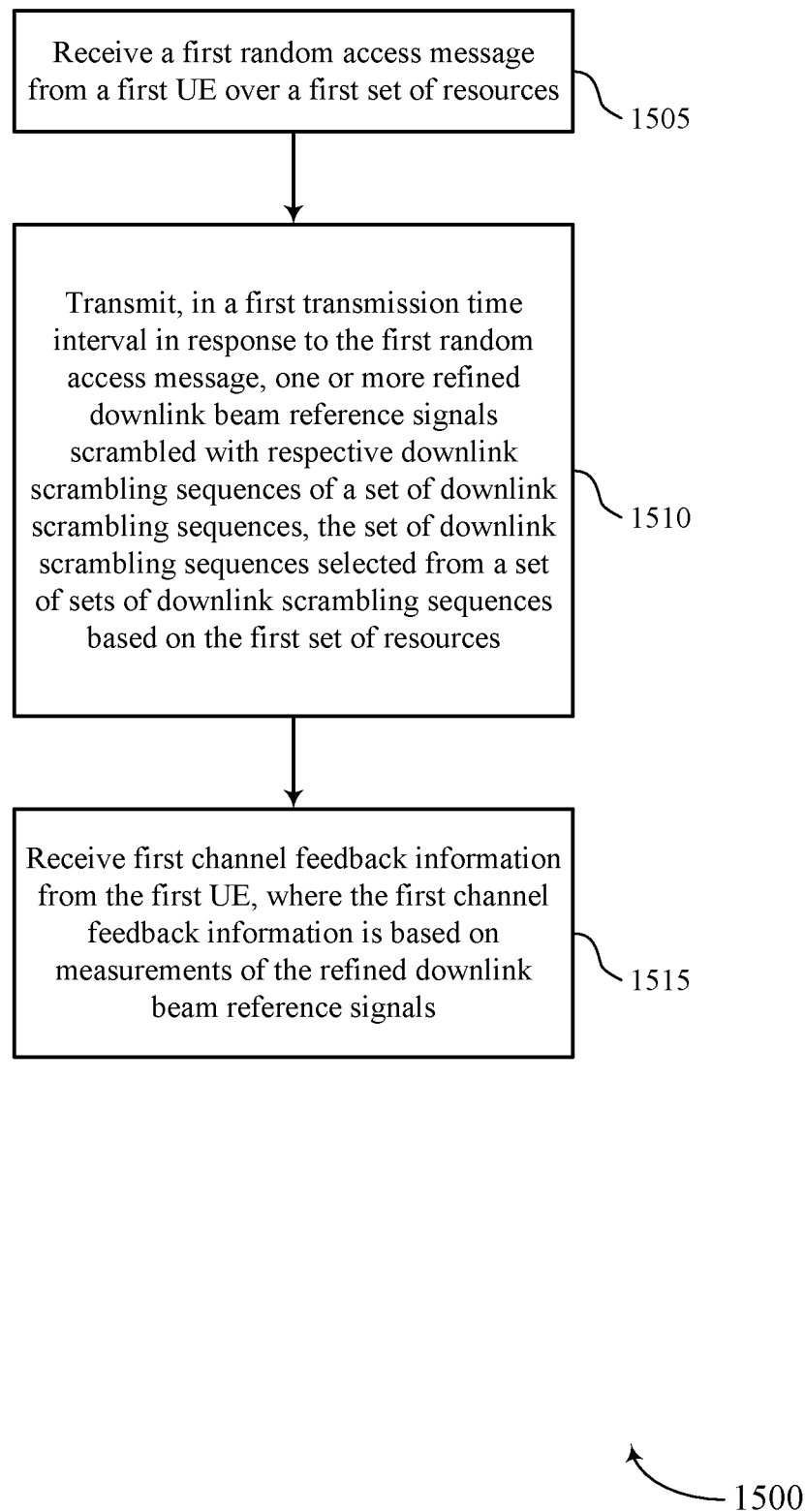
FIGS. 15 through 16 illustrate methods for scrambling sequences for reference signals during beam refinement in accordance with aspects of the present disclosure.

FIG. 15 shows a flowchart illustrating a method 1500 for scrambling sequences for reference signals during beam refinement in accordance with aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may receive a first random access message from a first UE over a first set of resources. For example, the base station 105 may monitor a set of PRACH resources for potential random access messages. The base station 105 may then correlate received signals on the PRACH resources against known preamble sequences to identify the first random access message. As such, the base station 105 may identify time-frequency resources over which the first random access message may be transmitted from the first UE. The base station 105 may then identify random access messages by correlating and/or demodulating the received signals. The operations of block 1505 may be performed according to the methods described herein. In certain examples, aspects of the operations of block 1505 may be performed by a PRACH component as described with reference to FIGS. 7 through 10.

At block 1510 the base station 105 may transmit, in a first TTI in response to the first random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources. For example, the base station 105 may encode bits that indicate the downlink beam reference signals, identify time-frequency resources over which the downlink beam reference signals are to be transmitted, and modulate the transmission over the identified time-frequency resources. The base station 105 may encode separate downlink beam reference signals on respective downlink beams. As such, the separate downlink beam reference signals may be transmitted over different or overlapping time-frequency resources (e.g., beams to different UEs may have reference signals transmitted on overlapping time-frequency resources but with different scrambling codes). Additionally, the base station 105 may transmit DCI to indicate the downlink beam reference signals. In some cases, the DCI may be transmitted prior to, concurrently with (e.g., part of), or after a random access response message transmitted based on the received first random access message. The operations of block 1510 may be performed according to the methods described herein. In certain examples, aspects of the operations of block 1510 may be performed by a reference signal manager as described with reference to FIGS. 7 through 10.

At block 1515 the base station 105 may receive first channel feedback information from the first UE, where the first channel feedback information is based on measurements of the downlink beam reference signals. For example, the base station 105 may identify time-frequency resources over which the first channel feedback information may be transmitted from the first UE. The base station 105 may demodulate the transmission over those time-frequency resources and decode the demodulated transmission to obtain bits that indicate the first channel feedback information. The operations of block 1515 may be performed according to the methods described herein. In certain examples, aspects of the operations of block 1515 may be performed by a beam manager as described with reference to FIGS. 7 through 10.

Figure 16:
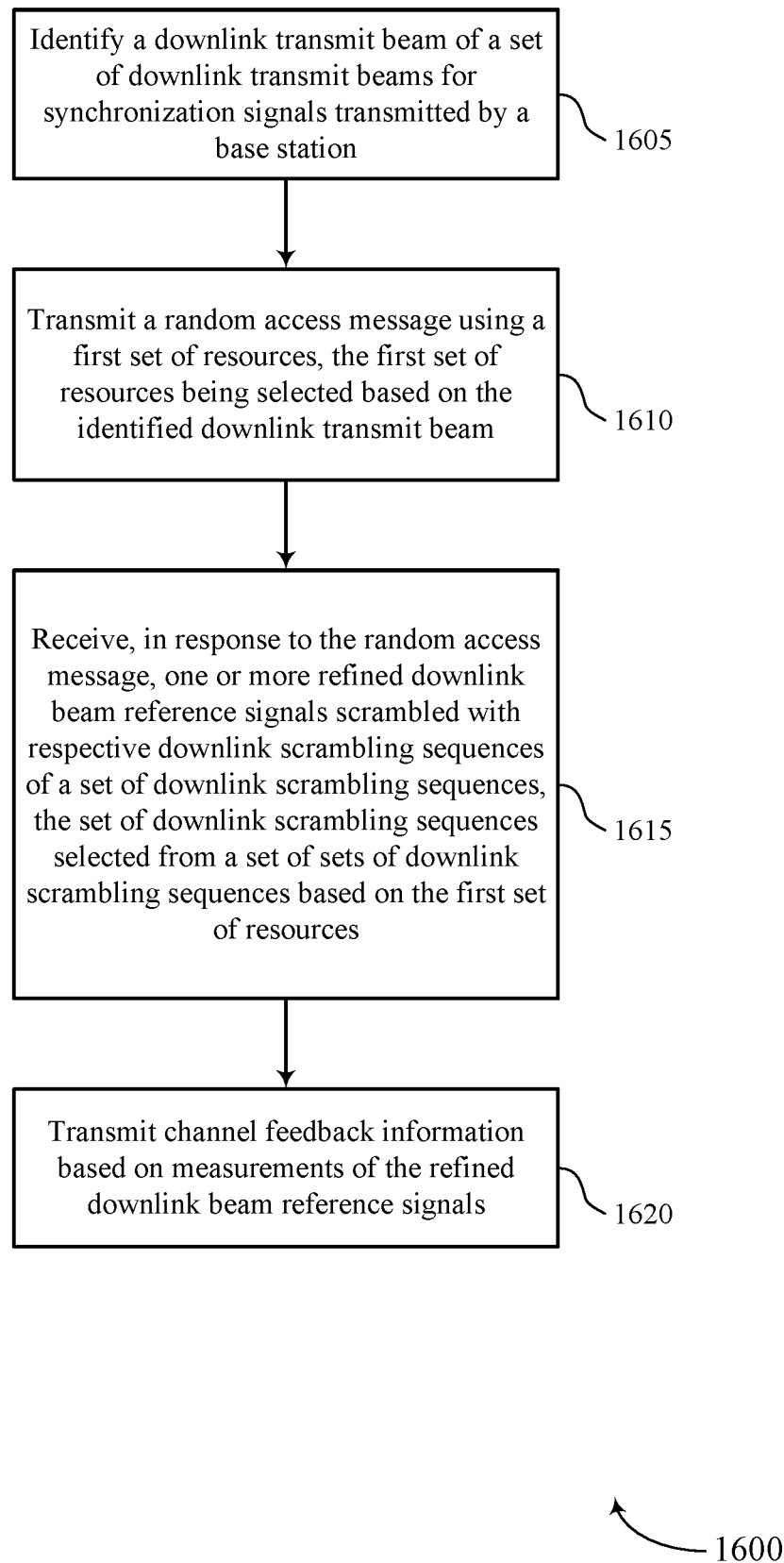

FIG. 16 shows a flowchart illustrating a method 1600 for scrambling sequences for reference signals during beam refinement in accordance with aspects of the present disclosure. The operations of method 1600 may be implemented by a UE 115 or its components as described herein. For example, the operations of method 1600 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a downlink transmit beam of a plurality of downlink transmit beams for synchronization signals transmitted by a base station. For example, the UE 115 may identify the downlink transmit beam for synchronization signals transmitted by the base station based on a synchronization period. In some cases, the base station may transmit the synchronization signals sequentially (e.g., in a beamswept fashion) or simultaneously. The operations of block 1605 may be performed according to the methods described herein. In certain examples, aspects of the operations of block 1605 may be performed by a synchronization manager as described with reference to FIGS. 11 through 14.

At block 1610 the UE 115 may transmit a random access message using a first set of resources. In some cases, the first set of resources may be selected based on the identified downlink transmit beam. For example, the UE 115 may identify the first set of resources, encode bits that indicate the random access message on the first set of resources, and modulate the random access message over the identified first set of resources. In some cases, the first set of resources may be contention or contention-free resources. For example, the base station may indicate the first set of resources (e.g., in an uplink grant or DCI) for the UE 115 to transmit the random access message. Alternatively, the UE 115 may transmit the random access message without receiving an uplink grant. The operations of block 1610 may be performed according to the methods described herein. In certain examples, aspects of the operations of block 1610 may be performed by a PRACH component as described with reference to FIGS. 11 through 14.

At block 1615 the UE 115 may receive, in response to the random access message, one or more downlink beam reference signals scrambled with respective downlink scrambling sequences of a set of downlink scrambling sequences, the set of downlink scrambling sequences selected from a plurality of sets of downlink scrambling sequences based on the first set of resources. For example, the UE 115 may identify time-frequency resources over which the downlink beam reference signals may be transmitted from a base station 105 serving the cell. The UE 115 may demodulate and descramble the transmission over those time-frequency resources and determine if the downlink beam reference signals were transmitted using one or more of the selected set of downlink scrambling sequences. The operations of block 1615 may be performed according to the methods described herein. In certain examples, aspects of the operations of block 1615 may be performed by a reference signal manager as described with reference to FIGS. 11 through 14.

At block 1620 the UE 115 may transmit channel feedback information based on measurements of the downlink beam reference signals. For example, the UE 115 may encode the channel feedback information, identify time-frequency resources over which the channel feedback information is to be transmitted, and modulate the channel feedback information over the identified time-frequency resources. The operations of block 1620 may be performed according to the methods described herein. In certain examples, aspects of the operations of block 1620 may be performed by a beam manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting a random access message using a first set of resources;
receiving, in response to the random access message, one or more downlink reference signals of a plurality of downlink reference signals, each downlink reference signal of the plurality of downlink reference signals scrambled with a respective downlink scrambling sequence of a set of downlink scrambling sequences, the set of downlink scrambling sequences selected from a plurality of sets of downlink scrambling sequences based at least in part on the first set of resources; and
transmitting channel feedback information based at least in part on one or more measurements of the one or more downlink reference signals.

2. The method of claim 1, further comprising:
receiving one or more transmissions from a network entity via a downlink beam pair comprising a downlink transmit beam and a downlink receive beam, the downlink beam pair selected based at least in part on the channel feedback information.

3. The method of claim 1, further comprising:
identifying a set of uplink scrambling sequences for one or more uplink reference signals from a plurality of sets of uplink scrambling sequences; and
transmitting the one or more uplink reference signals scrambled with respective ones of the set of uplink scrambling sequences.

4. The method of claim 3, wherein the set of uplink scrambling sequences is identified based at least in part on an indicator received in a random access response to the random access message.

5. The method of claim 3, wherein the set of uplink scrambling sequences is identified based at least in part on the first set of resources or an indicator received in a handover command.

6. The method of claim 1, further comprising:
receiving, in a first transmission time interval, a random access response to the random access message, the random access response comprising a grant of uplink resources for the channel feedback information.

7. The method of claim 6, wherein the random access response is received within a response window after the transmission of the random access message.

8. The method of claim 6, further comprising:
identifying a second transmission time interval for the receiving of the one or more downlink reference signals based at least in part on a downlink control information transmission.

9. The method of claim 8, wherein the second transmission time interval is prior to the first transmission time interval or subsequent to the first transmission time interval.

10. The method of claim 8, wherein the second transmission time interval and the first transmission time interval are a same transmission time interval.

11. The method of claim 6, wherein the random access response comprises an indicator of a second transmission time interval for transmission of uplink reference signals.

12. The method of claim 1, wherein the first set of resources comprise time resources, frequency resources, preamble resources, or a combination thereof.

13. The method of claim 1, wherein time and frequency resources for the one or more downlink reference signals are based at least in part on the first set of resources.

14. The method of claim 1, further comprising:
identifying a downlink transmit beam of a plurality of downlink transmit beams for synchronization signals output by a network entity; and
selecting the first set of resources based at least in part on the identified downlink transmit beam.

15. A method for wireless communication, comprising:
transmitting random access message using a first set of resources;
receiving, within a random access response window after transmitting the random access message, a random access response message and one or more downlink reference signals of a plurality of downlink reference signals, wherein the plurality of downlink reference signals are scrambled with respective downlink scrambling sequences of a set of downlink scrambling sequences, the set of downlink scrambling sequences selected from a plurality of sets of downlink scrambling sequences based at least in part on the first set of resources; and
transmitting channel feedback information based at least in part on one or more measurements of the one or more downlink reference signals.

16. The method of claim 15, wherein receiving the random access response message and the one or more downlink reference signals comprises:
receiving the random access response message in a first time interval of the random access response window; and
receiving the one or more downlink reference signals in a second time interval of the random access response window, the second time interval being different than the first time interval.

17. The method of claim 15, wherein receiving the random access response message and the one or more downlink reference signals comprises:
receiving the random access response message and the one or more downlink reference signals in a same time interval of the random access response window.

18. The method of claim 15, further comprising:
receiving downlink control information in a control region of a time interval of the random access response window, the downlink control information indicating a presence of the one or more downlink reference signals within the random access response window.

19. The method of claim 18, wherein receiving the downlink control information comprises:
receiving the downlink control information in a common search space in the control region of the time interval.

20. The method of claim 18, wherein receiving the one or more downlink reference signals comprises:
receiving the one or more downlink reference signals in a data region of the time interval of the random access response window.

21. The method of claim 18, wherein receiving the one or more downlink reference signals comprises:
receiving the one or more downlink reference signals in a data region of an additional time interval of the random access response window, the additional time interval occurring subsequent to the time interval.

22. The method of claim 18, further comprising:
receiving an additional downlink control information in the control region of the time interval of the random access response window, the additional downlink control information indicating a presence of the random access response message in a data region of the time interval of the random access response window.

23. The method of claim 18, wherein the downlink control information indicates a presence of the random access response message in a data region of the time interval of the random access response window.

24. The method of claim 18, wherein the downlink control information is scrambled with an identifier associated with the random access response message.

25. A method for wireless communication, comprising:
transmitting a random access message using a first set of resources;
receiving a random access response message based at least in part on the random access message;
transmitting, in response to the random access response message, one or more uplink reference signals, each uplink reference signal of the one or more uplink reference signals scrambled with a respective uplink scrambling sequence of a set of uplink scrambling sequences; and
transmitting, in response to the random access response message, an access report comprising an indication of a selected downlink transmit beam for one or more subsequent communications, the access report transmitted based at least in part on a grant received with the random access response message, wherein the access report and the one or more uplink reference signals are transmitted within a same time interval.

26. The method of claim 25, wherein the set of uplink scrambling sequences is identified based at least in part on an indicator received in the random access response message.

27. The method of claim 25, wherein the set of uplink scrambling sequences is identified based at least in part on the first set of resources or an indicator received in a handover command.

28. A method for wireless communication, comprising:
transmitting a random access message using a first set of resources;
receiving a random access response message based at least in part on the random access message;
transmitting, in response to the random access response message, one or more uplink reference signals, each uplink reference signal of the one or more uplink reference signals scrambled with a respective uplink scrambling sequence of a set of uplink scrambling sequences; and
transmitting, in response to the random access response message, an access report comprising an indication of a selected downlink transmit beam for one or more subsequent communications, the access report transmitted based at least in part on a grant received with the random access response message, wherein the access report and the one or more uplink reference signals are transmitted within different time intervals.

29. The method of claim 28, wherein the set of uplink scrambling sequences is identified based at least in part on an indicator received in the random access response message.

30. The method of claim 28, wherein the set of uplink scrambling sequences is identified based at least in part on the first set of resources or an indicator received in a handover command.

31. A method for wireless communication at a network entity, comprising:
   obtaining a random access message over a first set of resources;
   outputting, in response to the random access message, one or more downlink reference signals of a plurality of downlink reference signals, each downlink reference signal of the plurality of downlink reference signals scrambled with a respective downlink scrambling sequence of a set of downlink scrambling sequences, the set of downlink scrambling sequences selected from a plurality of sets of downlink scrambling sequences based at least in part on the first set of resources; and
   obtaining channel feedback information based at least in part on one or more measurements of the one or more downlink reference signals.

32. The method of claim 31, further comprising:
   outputting one or more transmissions via a downlink beam pair comprising a downlink transmit beam and a downlink receive beam, the downlink beam pair selected based at least in part on the channel feedback information.

33. A method for wireless communication, comprising:
   transmitting a random access message using a first set of resources;
   receiving a random access response message based at least in part on the random access message;
   transmitting, in response to the random access response message, one or more uplink reference signals, each uplink reference signal of the one or more uplink reference signals scrambled with a respective uplink scrambling sequence of a set of uplink scrambling sequences; and
   transmitting, in response to the random access response message, an access report based at least in part on a grant received with the random access response message, wherein the access report and the one or more uplink reference signals are transmitted within a same time interval.

34. The method of claim 33, wherein the set of uplink scrambling sequences is identified based at least in part on an indicator received in the random access response message.

35. The method of claim 33, wherein the set of uplink scrambling sequences is identified based at least in part on the first set of resources or an indicator received in a handover command.

36. An apparatus for wireless communication at a user equipment (UE), comprising:
   one or more memories; and
   one or more processors coupled with the one or more memories and configured to cause the UE to:
      transmit a random access message using a first set of resources;
      receive, in response to the random access message, one or more downlink reference signals of a plurality of downlink reference signals, each downlink reference signal of the plurality of downlink reference signals scrambled with a respective downlink scrambling sequence of a set of downlink scrambling sequences, the set of downlink scrambling sequences selected from a plurality of sets of downlink scrambling sequences based at least in part on the first set of resources; and
      transmit channel feedback information based at least in part on one or more measurements of the one or more downlink reference signals.

37. The apparatus of claim 36, wherein the one or more processors are further configured to cause the UE to:
   receive one or more transmissions from a network entity via a downlink beam pair comprising a downlink transmit beam and a downlink receive beam, the downlink beam pair selected based at least in part on the channel feedback information.

38. The apparatus of claim 36, wherein the one or more processors are further configured to cause the UE to:
   identify a set of uplink scrambling sequences for one or more uplink reference signals from a plurality of sets of uplink scrambling sequences; and
   transmit the one or more uplink reference signals scrambled with respective ones of the set of uplink scrambling sequences.

39. The apparatus of claim 38, wherein the set of uplink scrambling sequences is identified based at least in part on an indicator received in a random access response to the random access message.

40. The apparatus of claim 38, wherein the set of uplink scrambling sequences is identified based at least in part on the first set of resources or an indicator received in a handover command.

41. The apparatus of claim 36, wherein the one or more processors are further configured to cause the UE to:
   receive, in a first transmission time interval, a random access response to the random access message, the random access response comprising a grant of uplink resources for the channel feedback information.

42. An apparatus for wireless communication at a user equipment (UE), comprising:
   one or more memories; and
   one or more processors coupled with the one or more memories and configured to cause the UE to:
      transmit a random access message using a first set of resources;
      receive, within a random access response window after the first set of resources, a random access response message and one or more downlink reference signals of a plurality of downlink reference signals, wherein the plurality of downlink reference signals are scrambled with respective downlink scrambling sequences of a set of downlink scrambling sequences, the set of downlink scrambling sequences selected from a plurality of sets of downlink scrambling sequences based at least in part on the first set of resources; and
      transmit channel feedback information based at least in part on one or more measurements of the one or more downlink reference signals.

43. The apparatus of claim 42, wherein the one or more processors are further configured to cause the UE to:

receive the random access response message in a first time interval of the random access response window; and receive the one or more downlink reference signals in a second time interval of the random access response window, the second time interval being different than the first time interval.

44. The apparatus of claim 42, wherein the one or more processors are further configured to cause the UE to:

receive the random access response message and the one or more downlink reference signals in a same time interval of the random access response window.

45. The apparatus of claim 42, wherein the one or more processors are further configured to cause the UE to:

receive downlink control information in a control region of a time interval of the random access response window, the downlink control information indicating a presence of the one or more downlink reference signals within the random access response window.

46. An apparatus for wireless communication at a user equipment (UE), comprising:

one or more memories; and one or more processors coupled with the one or more memories and configured to cause the UE to:

transmit a random access message using a first set of resources;

receive a random access response message based at least in part on the random access message;

transmit, in response to the random access response message, one or more uplink reference signals, each uplink reference signal of the one or more uplink reference signals scrambled with a respective uplink scrambling sequence of a set of uplink scrambling sequences; and transmit, in response to the random access response message, an access report comprising an indication of a selected downlink transmit beam for one or more subsequent communications, the access report transmitted based at least in part on a grant received with the random access response message, wherein the access report and the one or more uplink reference signals are transmitted within a same time interval.

47. The apparatus of claim 46, wherein the set of uplink scrambling sequences is identified based at least in part on an indicator received in the random access response message.

48. The apparatus of claim 46, wherein the set of uplink scrambling sequences is identified based at least in part on the first set of resources or an indicator received in a handover command.

49. An apparatus for wireless communication at a user equipment (UE), comprising:

one or more memories; and one or more processors coupled with the one or more memories and configured to cause the UE to:

transmit a random access message using a first set of resources;

receive a random access response message based at least in part on the random access message;

transmit, in response to the random access response message, one or more uplink reference signals, each uplink signal of the one or more uplink reference signals scrambled with a respective uplink scrambling sequence of a set of uplink scrambling sequences; and transmit, in response to the random access response message, an access report comprising an indication of a selected downlink transmit beam for one or more subsequent communications, the access report transmitted based at least in part on a grant received with the random access response message, wherein the access report and the one or more uplink reference signals are transmitted within different time intervals.

50. The apparatus of claim 49, wherein the set of uplink scrambling sequences is identified based at least in part on an indicator received in the random access response message.

51. The apparatus of claim 49, wherein the set of uplink scrambling sequences is identified based at least in part on the first set of resources or an indicator received in a handover command.

52. An apparatus for wireless communication at a network entity, comprising:

one or more memories; and one or more processors coupled with the one or more memories and configured to cause the network entity to:

obtain a random access message using a first set of resources;

output, in response to the random access message, one or more downlink reference signals of a plurality of downlink reference signals, each downlink reference signal of the plurality of downlink reference signals scrambled with a respective downlink scrambling sequence of a set of downlink scrambling sequences, the set of downlink scrambling sequences selected from a plurality of sets of downlink scrambling sequences based at least in part on the first set of resources; and obtain channel feedback information based at least in part on one or more measurements of the one or more downlink reference signals.

53. The apparatus of claim 52, wherein the one or more processors are further configured to cause the network entity to:

output one or more transmissions via a downlink beam pair comprising a downlink transmit beam and a downlink receive beam, the downlink beam pair selected based at least in part on the channel feedback information.

54. The apparatus of claim 52, wherein the one or more processors are further configured to cause the network entity to:

obtain one or more uplink reference signals scrambled with respective ones of a set of uplink scrambling sequences for the one or more uplink reference signals, the set of uplink scrambling sequences being of a plurality of sets of uplink scrambling sequences.

55. The apparatus of claim 54, wherein the set of uplink scrambling sequences is based at least in part on an indicator in a random access response to the random access message.

56. The apparatus of claim 54, wherein the set of uplink scrambling sequences is based at least in part on the first set of resources or an indicator in a handover command.

57. The apparatus of claim 52, wherein the one or more processors are further configured to cause the network entity to:

output, in a first transmission time interval, a random access response to the random access message, the random access response comprising a grant of uplink resources for the channel feedback information.

58. An apparatus for wireless communication at a user equipment (UE), comprising:

one or more memories; and
one or more processors coupled with the one or more memories and configured to cause the UE to:
  transmit a random access message using a first set of resources;
  receive a random access response message based at least in part on the random access message;
  transmit, in response to the random access response message, one or more uplink reference signals, each uplink reference signal of the one or more uplink reference signals scrambled with a respective uplink scrambling sequence of a set of uplink scrambling sequences; and
  transmit, in response to the random access response message, an access report based at least in part on a grant received with the random access response message, wherein the access report and the one or more uplink reference signals are transmitted within a same time interval.

59. The apparatus of claim 58, wherein the set of uplink scrambling sequences is identified based at least in part on an indicator received in the random access response message.

60. The apparatus of claim 58, wherein the set of uplink scrambling sequences is identified based at least in part on the first set of resources or an indicator received in a handover command.

61. A non-transitory computer-readable medium storing code for wireless communication at a user equipment (UE), the code comprising instructions executable by one or more processors to cause the UE to:
  transmit a random access message using a first set of resources;
  receive, in response to the random access message, one or more downlink reference signals of a plurality of downlink reference signals transmitted, each downlink reference signal of the plurality of downlink reference signals scrambled with a respective downlink scrambling sequence of a set of downlink scrambling sequences, the set of downlink scrambling sequences selected from a plurality of sets of downlink scrambling sequences based at least in part on the first set of resources; and
  transmit channel feedback information based at least in part on one or more measurements of the one or more downlink reference signals.

62. A non-transitory computer-readable medium storing code for wireless communication at a user equipment (UE), the code comprising instructions executable by one or more processors to cause the UE to:
  transmit a random access message using a first set of resources;
  receive, within a random access response window after the first set of resources, a random access response message and one or more downlink reference signals of a plurality of downlink reference signals, wherein the plurality of downlink reference signals are scrambled with respective downlink scrambling sequences of a set of downlink scrambling sequences, the set of downlink scrambling sequences selected from a plurality of sets of downlink scrambling sequences based at least in part on the first set of resources; and
  transmit channel feedback information based at least in part on one or more measurements of the one or more downlink reference signals.

63. A non-transitory computer-readable medium storing code for wireless communication at a user equipment (UE), the code comprising instructions executable by one or more processors to cause the UE to:
  transmit a random access message using a first set of resources;
  receive a random access response message based at least in part on transmitting the random access message;
  transmit, in response to the random access response message, one or more uplink reference signals, each uplink reference signal of the one or more uplink reference signals scrambled with a respective uplink scrambling sequence of a set of uplink scrambling sequences; and
  transmit, in response to the random access response message, an access report comprising an indication of a selected downlink transmit beam for one or more subsequent communications, the access report transmitted based at least in part on a grant received with the random access response message, wherein the access report and the one or more uplink reference signals are transmitted within a same time interval.

64. A non-transitory computer-readable medium storing code for wireless communication at a user equipment (UE), the code comprising instructions executable by one or more processors to cause the UE to:
  transmit a random access message using a first set of resources;
  receive a random access response message based at least in part on the random access message;
  transmit, in response to the random access response message, one or more uplink reference signals, each uplink reference signal of the one or more uplink reference signals scrambled with a respective uplink scrambling sequence of a set of uplink scrambling sequences; and
  transmit, in response to the random access response message, an access report comprising an indication of a selected downlink transmit beam for one or more subsequent communications, the access report transmitted based at least in part on a grant received with the random access response message, wherein the access report and the one or more uplink reference signals are transmitted within different time intervals.

65. A non-transitory computer-readable medium storing code for wireless communication at a network entity, the code comprising instructions executable by one or more processors to cause the network entity to:
  obtain a random access message over a first set of resources;
  output, in response to the random access message, one or more downlink reference signals of a plurality of downlink reference signals, each uplink reference signal of the plurality of downlink reference signals scrambled with a respective downlink scrambling sequence of a set of downlink scrambling sequences, the set of downlink scrambling sequences selected from a plurality of sets of downlink scrambling sequences based at least in part on the first set of resources; and
  obtain channel feedback information based at least in part on one or more measurements of the one or more downlink reference signals.

66. A non-transitory computer-readable medium storing code for wireless communication at a user equipment (UE), the code comprising instructions executable by one or more processors to cause the UE to:
  transmit a random access message using a first set of resources;

receive a random access response message based at least in part on the random access message;

transmit, in response to the random access response message, one or more uplink reference signals, each uplink reference signal of the one or more uplink reference signals scrambled with a respective uplink scrambling sequence of a set of uplink scrambling sequences; and transmit, in response to the random access response message, an access report based at least in part on a grant received with the random access response message, wherein the access report and the one or more uplink reference signals are transmitted within a same time interval.

67. An apparatus for wireless communication at a network entity, comprising:

one or more memories; and one or more processors coupled with the one or more memories and configured to cause the network entity to:

obtain a random access message over a first set of resources;

output, within a random access response window after the first set of resources, a random access response message and one or more downlink reference signals of a plurality of downlink reference signals, wherein the one or more downlink reference signals are output based at least in part on the first set of resources, and wherein the plurality of downlink reference signals are scrambled with respective downlink scrambling sequences of a set of downlink scrambling sequences, the set of downlink scrambling sequences selected from a plurality of sets of downlink scrambling sequences based at least in part on the first set of resources; and obtain channel feedback information based at least in part on one or more measurements of the one or more downlink reference signals.

68. The apparatus of claim 67, wherein the one or more processors are further configured to cause the network entity to:

output the random access response message in a first time interval of the random access response window; and output the one or more downlink reference signals in a second time interval of the random access response window, the second time interval being different than the first time interval.

69. The apparatus of claim 67, wherein the one or more processors are further configured to cause the network entity to:

output the random access response message and the one or more downlink reference signals in a same time interval of the random access response window.

70. The apparatus of claim 67, wherein the one or more processors are further configured to cause the network entity to:

output downlink control information in a control region of a time interval of the random access response window, the downlink control information indicating a presence of the one or more downlink reference signals within the random access response window.

71. An apparatus for wireless communication at a network entity, comprising:

one or more memories; and one or more processors coupled with the one or more memories and configured to cause the network entity to:

obtain a random access message over a first set of resources;

output a random access response message based at least in part on the random access message;

obtain, in response to the random access response message, one or more uplink reference signals, each uplink reference signal of the one or more uplink reference signals scrambled with a respective uplink scrambling sequence of a set of uplink scrambling sequences; and obtain, in response to the random access response message, an access report comprising an indication of a selected downlink transmit beam for one or more subsequent communications, the access report based at least in part on a grant output with the random access response message, wherein the access report and the one or more uplink reference signals are obtained within a same time interval.

72. The apparatus of claim 71, wherein the set of uplink scrambling sequences is based at least in part on an indicator in the random access response message.

73. The apparatus of claim 71, wherein the set of uplink scrambling sequences is based at least in part on the first set of resources or an indicator in a handover command.

74. An apparatus for wireless communication at a network entity, comprising:

one or more memories; and one or more processors coupled with the one or more memories and configured to cause the network entity to:

obtain a random access message over a first set of resources;

output a random access response message based at least in part on the random access message;

obtain, in response to the random access response message, one or more uplink reference signals, each uplink reference signal of the one or more uplink reference signals scrambled with a respective uplink scrambling sequence of a set of uplink scrambling sequences; and obtain, in response to the random access response message, an access report comprising an indication of a selected downlink transmit beam for one or more subsequent communications, the access report based at least in part on a grant output with the random access response message, wherein the access report and the one or more uplink reference signals are obtained within different time intervals.

75. The apparatus of claim 74, wherein the set of uplink scrambling sequences is based at least in part on an indicator in the random access response message.

76. The apparatus of claim 74, wherein the set of uplink scrambling sequences is based at least in part on the first set of resources or an indicator in a handover command.

77. An apparatus for wireless communication at a network entity, comprising:

one or more memories; and one or more processors coupled with the one or more memories and configured to cause the network entity to:

obtain a random access message over a first set of resources;

output a random access response message based at least in part on the random access message;

obtain, in response to the random access response message, one or more uplink reference signals, each uplink reference signal of the one or more uplink reference signals scrambled with a respective uplink scrambling sequence of a set of uplink scrambling sequences; and obtain, in response to the random access response message, an access report based at least in part on a grant output with the random access response message, wherein the access report and the one or more uplink reference signals are obtained within a same time interval.

78. The apparatus of claim 77, wherein the set of uplink scrambling sequences is based at least in part on an indicator in the random access response message.

79. The apparatus of claim 77, wherein the set of uplink scrambling sequences is based at least in part on the first set of resources or an indicator in a handover command.

80. A method for wireless communication, comprising:

obtaining a random access message over a first set of resources;

outputting a random access response message based at least in part on the random access message;

obtaining, in response to the random access response message, one or more uplink reference signals, each uplink reference signal of the one or more uplink reference signals scrambled with a respective uplink scrambling sequence of a set of uplink scrambling sequences; and obtaining, in response to the random access response message, an access report based at least in part on a grant output with the random access response message, wherein the access report and the one or more uplink reference signals are obtained within a same time interval.

81. The method of claim 80, wherein the set of uplink scrambling sequences is based at least in part on an indicator in the random access response message.

82. The method of claim 80, wherein the set of uplink scrambling sequences is based at least in part on the first set of resources or an indicator in a handover command.

83. A non-transitory computer-readable medium storing code for wireless communication at a network entity, the code comprising instructions executable by one or more processors to cause the network entity to:

obtain a random access message over a first set of resources;

output, in response to the random access message, one or more downlink reference signals of a plurality of downlink reference signals, each downlink reference signal of the plurality of downlink reference signals scrambled with a respective downlink scrambling sequence of a set of downlink scrambling sequences, the set of downlink scrambling sequences selected from a plurality of sets of downlink scrambling sequences based at least in part on the first set of resources; and obtain channel feedback information based at least in part on one or more measurements of the one or more downlink reference signals.

84. A non-transitory computer-readable medium storing code for wireless communication at a network entity, the code comprising instructions executable by one or more processors to cause the network entity to:

obtain a random access message over a first set of resources;

output, within a random access response window after the first set of resources, a random access response message and one or more downlink reference signals of a plurality of downlink reference signals, wherein the one or more downlink reference signals are output based at least in part on the first set of resources, and wherein the plurality of downlink reference signals are scrambled with respective downlink scrambling sequences of a set of downlink scrambling sequences, the set of downlink scrambling sequences selected from a plurality of sets of downlink scrambling sequences based at least in part on the first set of resources; and obtain channel feedback information based at least in part on one or more measurements of the one or more downlink reference signals.

85. A non-transitory computer-readable medium storing code for wireless communication at a network entity, the code comprising instructions executable by one or more processors to cause the network entity to:

obtain a random access message over a first set of resources;

output a random access response message based at least in part on the random access message;

obtain, in response to the random access response message, one or more uplink reference signals, each uplink reference signal of the one or more uplink reference signals scrambled with a respective uplink scrambling sequence of a set of uplink scrambling sequences; and obtain, in response to the random access response message, an access report comprising an indication of a selected downlink transmit beam for one or more subsequent communications, the access report based at least in part on a grant output with the random access response message, wherein the access report and the one or more uplink reference signals are obtained within a same time interval.

86. A non-transitory computer-readable medium storing code for wireless communication at a network entity, the code comprising instructions executable by one or more processors to cause the network entity to:

obtain a random access message over a first set of resources;

output a random access response message based at least in part on the random access message;

obtain, in response to the random access response message, one or more uplink reference signals, each uplink reference signal of the one or more uplink reference signals scrambled with a respective uplink scrambling sequence of a set of uplink scrambling sequences; and obtain, in response to the random access response message, an access report comprising an indication of a selected downlink transmit beam for one or more subsequent communications, the access report based at least in part on a grant output with the random access response message, wherein the access report and the one or more uplink reference signals are obtained within different time intervals.

87. A non-transitory computer-readable medium storing code for wireless communication at a network entity, the code comprising instructions executable by one or more processors to cause the network entity to:

obtain a random access message over a first set of resources;

output a random access response message based at least in part on the random access message;

obtain, in response to the random access response message, one or more uplink reference signals, each uplink reference signal of the one or more uplink reference signals scrambled with a respective uplink scrambling sequence of a set of uplink scrambling sequences; and obtain, in response to the random access response message, an access report based at least in part on a grant output with the random access response message, wherein the access report and the one or more uplink reference signals are obtained within a same time interval.

88. The non-transitory computer-readable medium of claim 87, wherein the set of uplink scrambling sequences is based at least in part on an indicator in the random access response message.

89. The non-transitory computer-readable medium of claim 87, wherein the set of uplink scrambling sequences is based at least in part on the first set of resources or an indicator in a handover command.

90. An apparatus for wireless communication, comprising:
   means for transmitting a random access message using a first set of resources;
   means for receiving a random access response message based at least in part on the random access message;
   means for transmitting, in response to the random access response message, one or more uplink reference signals, each uplink reference signal of the one or more uplink reference signals scrambled with a respective uplink scrambling sequence of a set of uplink scrambling sequences; and
   means for transmitting, in response to the random access response message, an access report based at least in part on a grant received with the random access response message, wherein the access report and the one or more uplink reference signals are transmitted within a same time interval.

91. The apparatus of claim 90, wherein the set of uplink scrambling sequences is identified based at least in part on an indicator received in the random access response message.

92. An apparatus for wireless communication, comprising:
   means for obtaining a random access message over a first set of resources;
   means for outputting a random access response message based at least in part on the random access message;
   means for obtaining, in response to the random access response message, one or more uplink reference signals, each uplink reference signal of the one or more uplink reference signals scrambled with a respective uplink scrambling sequence of a set of uplink scrambling sequences; and
   means for obtaining, in response to the random access response message, an access report based at least in part on a grant output with the random access response message, wherein the access report and the one or more uplink reference signals are obtained within a same time interval.

93. The apparatus of claim 92, wherein the set of uplink scrambling sequences is based at least in part on an indicator in the random access response message.

* * * * *